US008842366B2

(12) United States Patent
Arnett et al.

(10) Patent No.: US 8,842,366 B2
(45) Date of Patent: Sep. 23, 2014

(54) TRANSMISSIVE BODY

(75) Inventors: Kenneth Edmund Arnett, Boulder, CO (US); Robert Bruce Charters, Palmerston (AU); Chan Hong Wang, Acton (AU); Graham Roy Atkins, Kaleen (AU); Ian Andrew Maxwell, Five Dock (AU); Duncan Ian Ross, Acton (AU)

(73) Assignee: Zetta Research and Development LLC—RPO Series, Wilmington, DE (US)

( * ) Notice: Subject to any disclaimer, the term of this patent is extended or adjusted under 35 U.S.C. 154(b) by 1838 days.

(21) Appl. No.: 12/119,343

(22) Filed: May 12, 2008

(65) Prior Publication Data

US 2008/0278460 A1 Nov. 13, 2008

Related U.S. Application Data

(60) Provisional application No. 60/917,567, filed on May 11, 2007, provisional application No. 60/971,696, filed on Sep. 12, 2007.

(51) Int. Cl.
*G02B 27/10* (2006.01)
*G02B 27/30* (2006.01)
*F21V 7/04* (2006.01)
*G06F 3/042* (2006.01)
*F21V 8/00* (2006.01)

(52) U.S. Cl.
CPC ............ *G06F 3/0428* (2013.01); *G02B 6/0046* (2013.01); *G02B 6/0021* (2013.01); *G06F 2203/04109* (2013.01); *G02B 6/0045* (2013.01)
USPC .............................. 359/618; 359/641; 362/610

(58) Field of Classification Search
USPC .......... 359/618, 636, 641, 626; 362/606–608, 362/610
See application file for complete search history.

(56) References Cited

U.S. PATENT DOCUMENTS

| 3,478,220 A | 11/1969 | Milroy |
| 3,673,327 A | 6/1972 | Johnson et al. |
| 4,068,121 A | 1/1978 | Bringhurst et al. |
| 4,517,559 A | 5/1985 | Deitch et al. |
| 4,737,626 A | 4/1988 | Hasegawa |
| 4,837,430 A | 6/1989 | Hasegawa |
| 4,986,662 A | 1/1991 | Bures |

(Continued)

FOREIGN PATENT DOCUMENTS

| WO | WO 03/038592 A1 | 5/2003 | |
| WO | WO2006104203 | * 10/2006 | ............... F21V 8/00 |
| WO | WO 2007/048180 A1 | 5/2007 | |

OTHER PUBLICATIONS

International Search Report from counterpart application No. PCT/AU2008/000658, Jul. 2006.

*Primary Examiner* — Alicia M Harrington
(74) *Attorney, Agent, or Firm* — Mattingly & Malur, PC

(57) ABSTRACT

An apparatus and method for transmitting, collimating and redirecting light from a point-like source to produce a collimated optical signal in a substantially planar form are provided. In one embodiment, the apparatus is manufactured as a unitary transmissive body comprising a collimation element and a redirection element, and optionally a transmissive element. In another embodiment, the apparatus is assembled from one or more components. The apparatus and method are useful for providing sensing light for an optical touch input device or for providing illumination for a display.

78 Claims, 48 Drawing Sheets

(56) References Cited

U.S. PATENT DOCUMENTS

| | | |
|---|---|---|
| 4,988,983 A | 1/1991 | Wehrer |
| 5,050,946 A | 9/1991 | Hathaway et al. |
| 5,220,409 A | 6/1993 | Bures |
| 5,237,641 A * | 8/1993 | Jacobson et al. ............... 385/146 |
| 5,303,322 A | 4/1994 | Winston et al. |
| 5,914,709 A | 6/1999 | Graham et al. |
| 5,914,760 A | 6/1999 | Daiku |
| 6,181,842 B1 | 1/2001 | Francis et al. |
| 6,295,104 B1 | 9/2001 | Egawa et al. |
| 6,351,260 B1 | 2/2002 | Graham et al. |
| 6,379,017 B2 | 4/2002 | Nakabayashi et al. |
| 6,576,887 B2 | 6/2003 | Whitney et al. |
| 6,590,625 B1 | 7/2003 | Umemoto et al. |
| 6,597,508 B2 | 7/2003 | Seino et al. |
| 6,972,753 B1 | 12/2005 | Kimura et al. |
| 7,099,553 B1 * | 8/2006 | Graham et al. ............... 385/146 |
| 7,364,341 B2 * | 4/2008 | Parker et al. ................... 359/615 |
| 7,614,775 B2 * | 11/2009 | Iwasaki ......................... 362/616 |
| 2004/0196665 A1 | 10/2004 | Travis |
| 2005/0243070 A1 | 11/2005 | Ung et al. |
| 2005/0248540 A1 | 11/2005 | Newton |
| 2005/0271326 A1 | 12/2005 | Luo |
| 2006/0158437 A1 | 7/2006 | Blythe et al. |
| 2007/0274099 A1 * | 11/2007 | Tai et al. ....................... 362/610 |
| 2008/0006766 A1 | 1/2008 | Oon et al. |
| 2008/0088593 A1 | 4/2008 | Smoot |

* cited by examiner

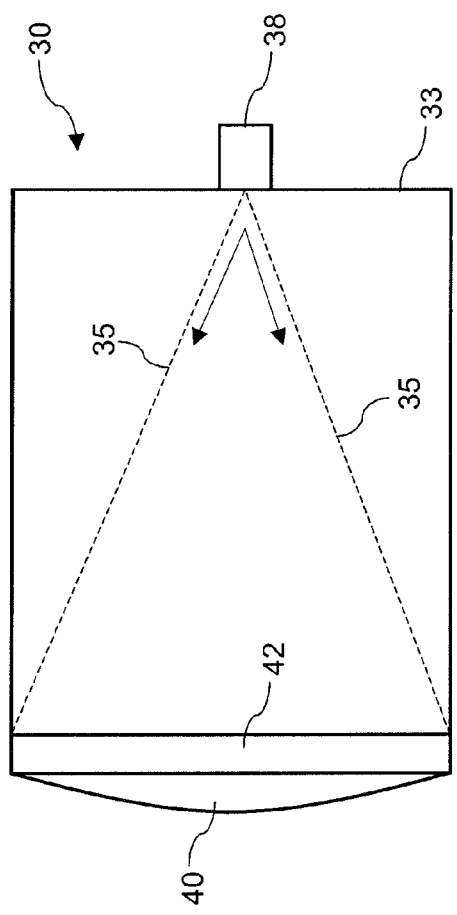
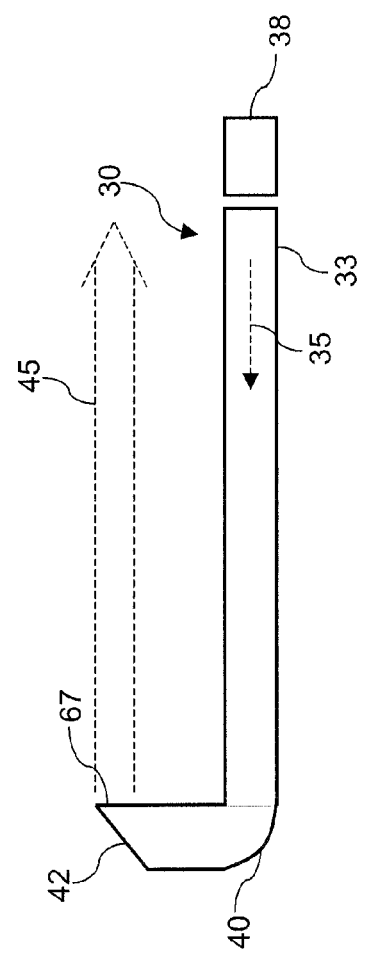
Fig. 3 PRIOR ART
Fig. 4

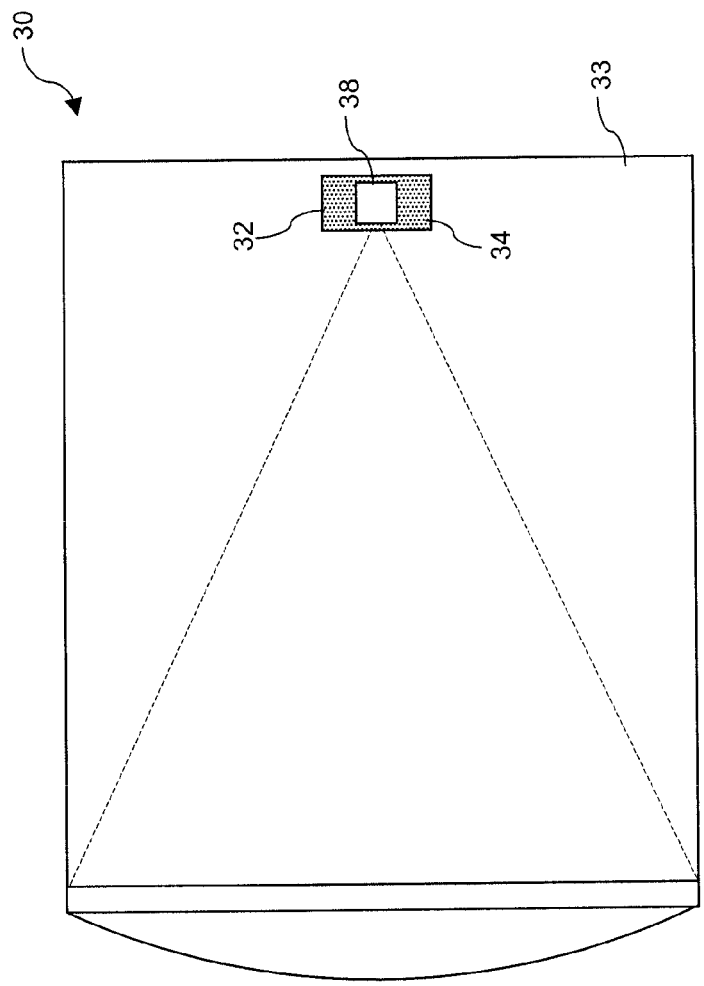

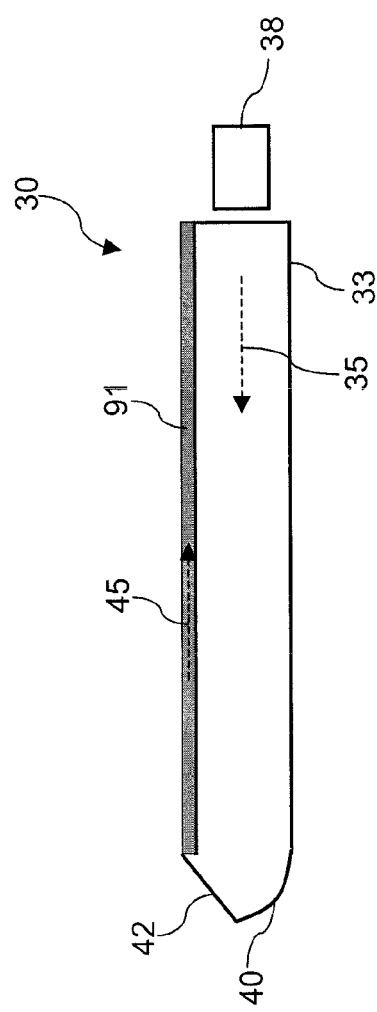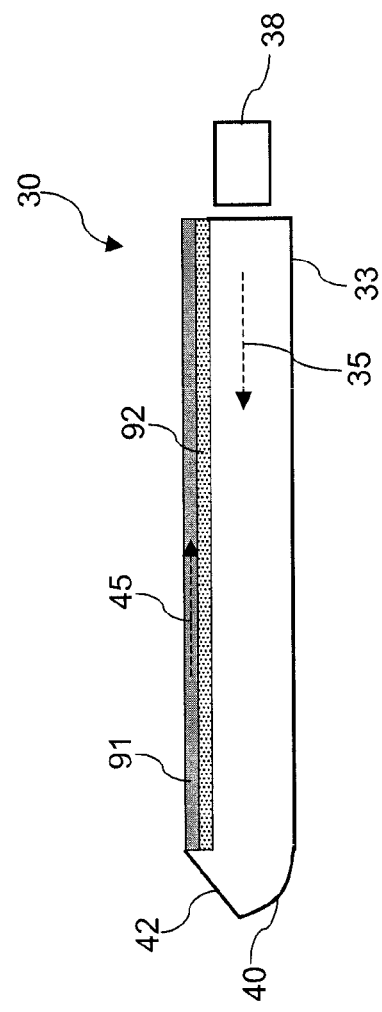

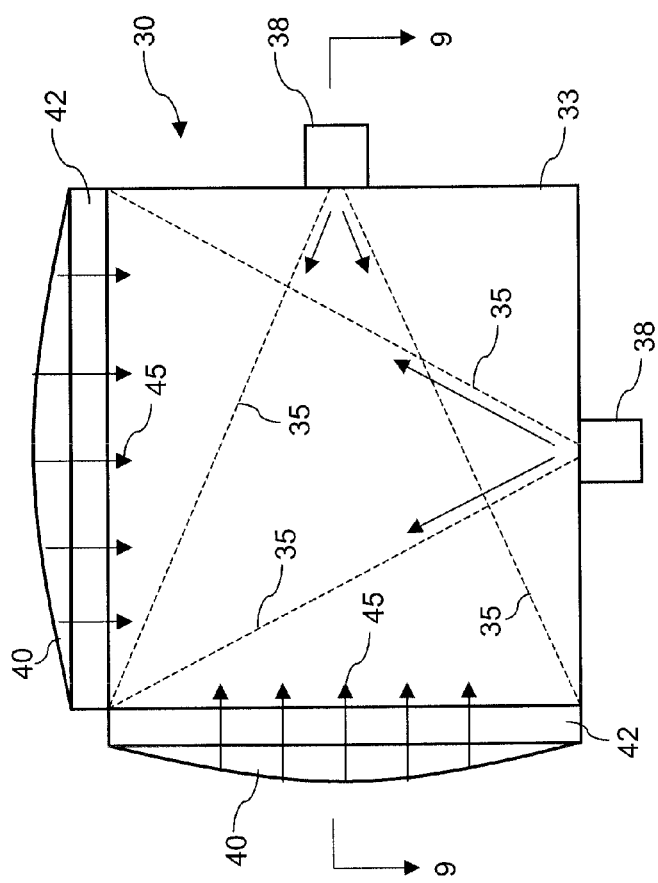
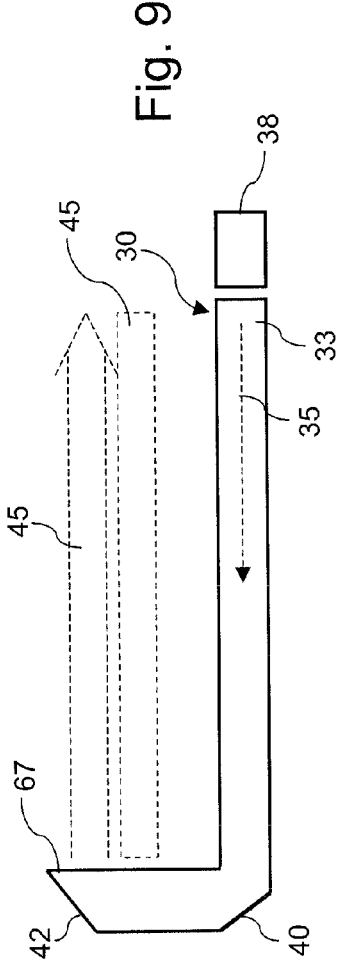

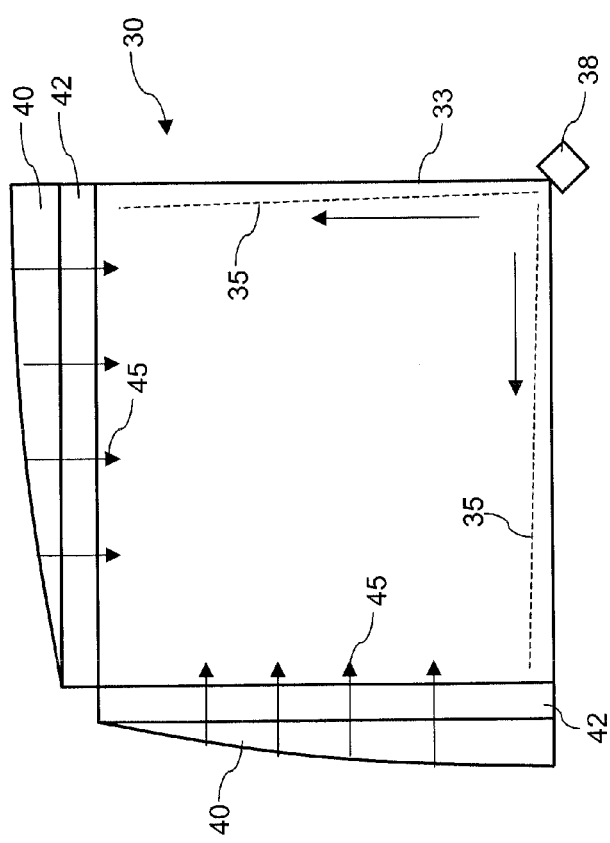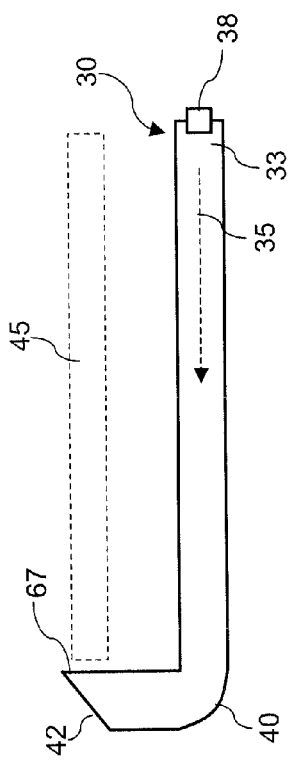

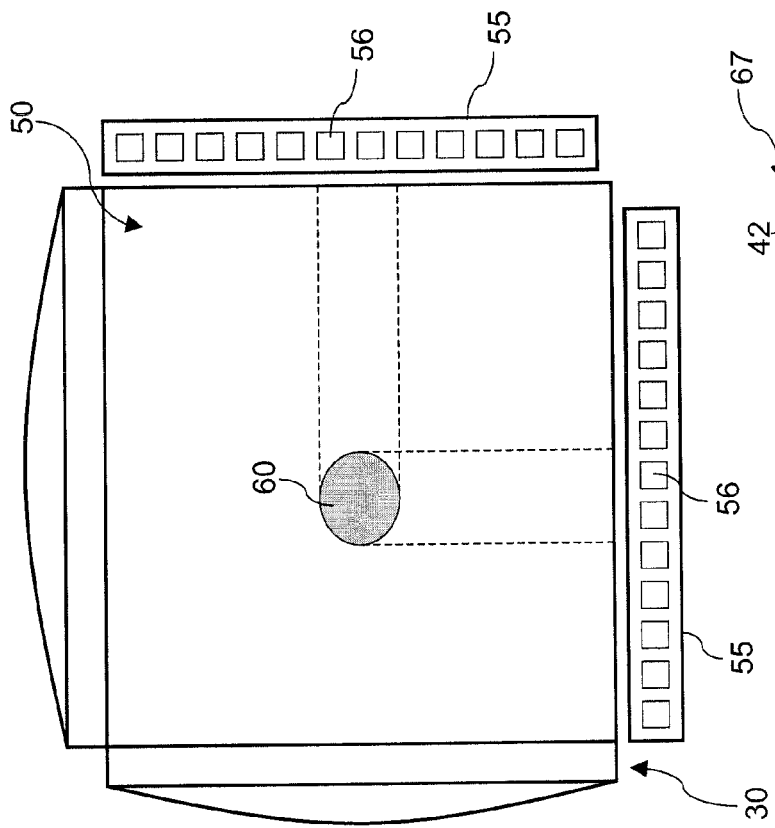
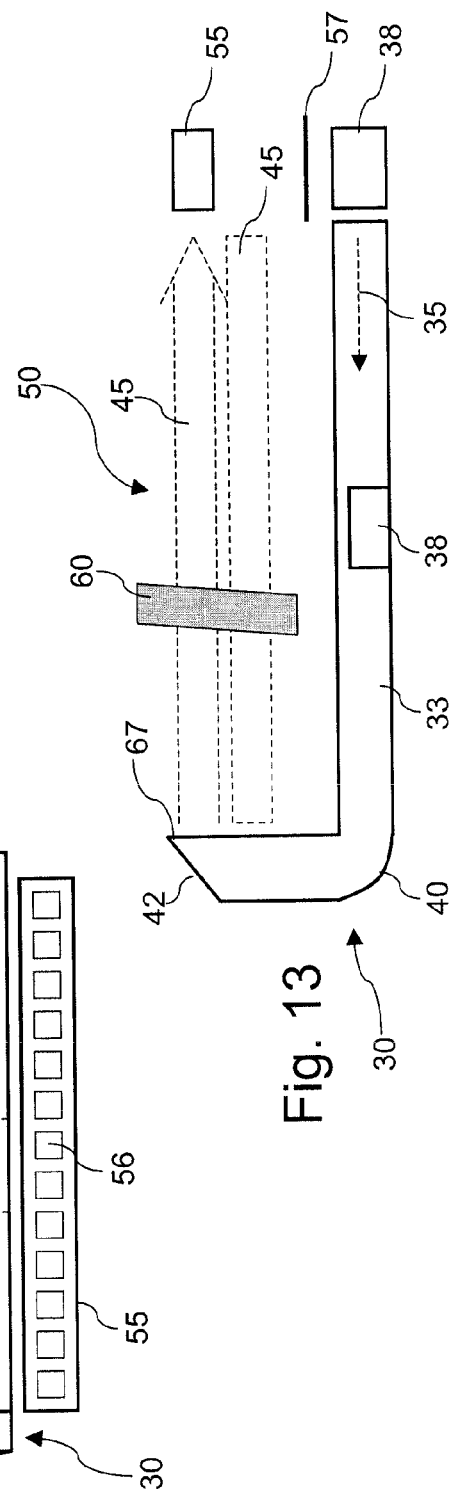

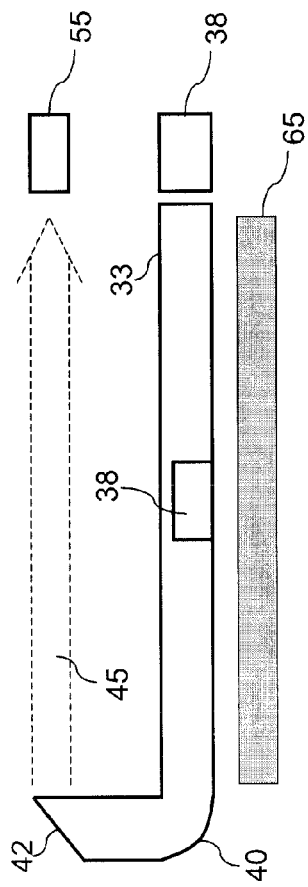
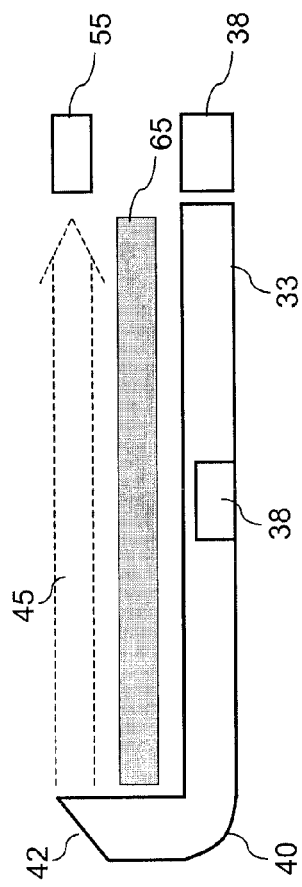
Fig. 16
Fig. 17

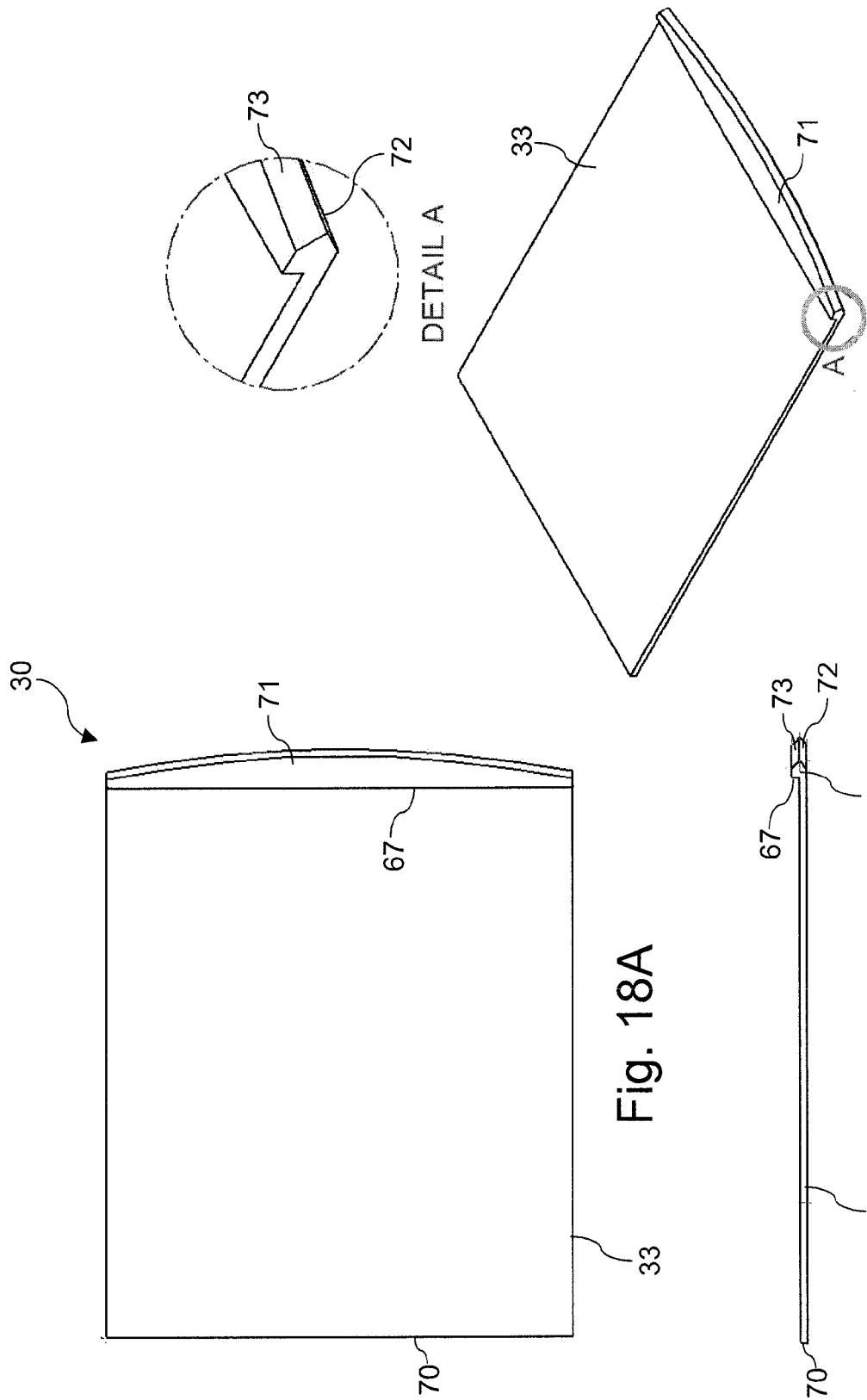

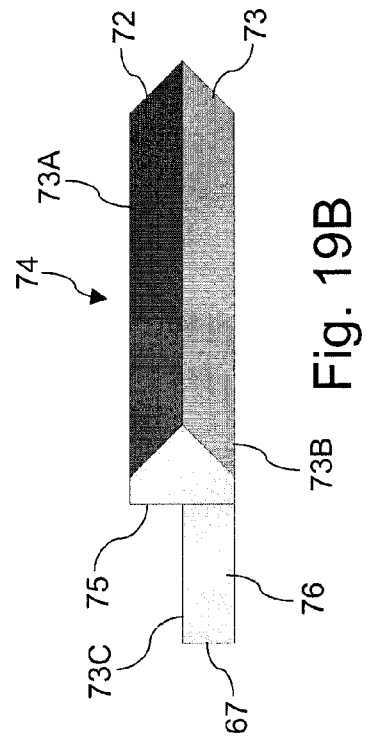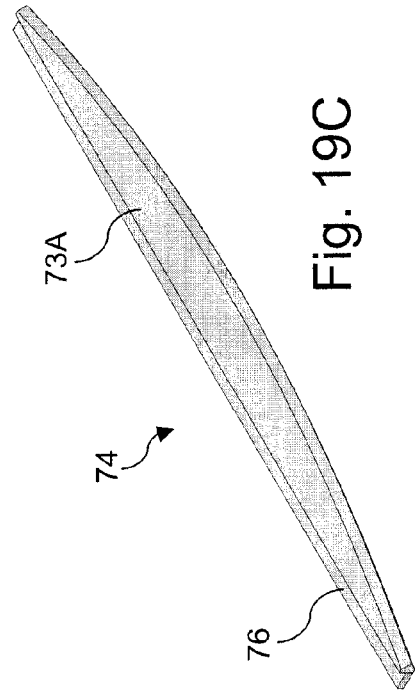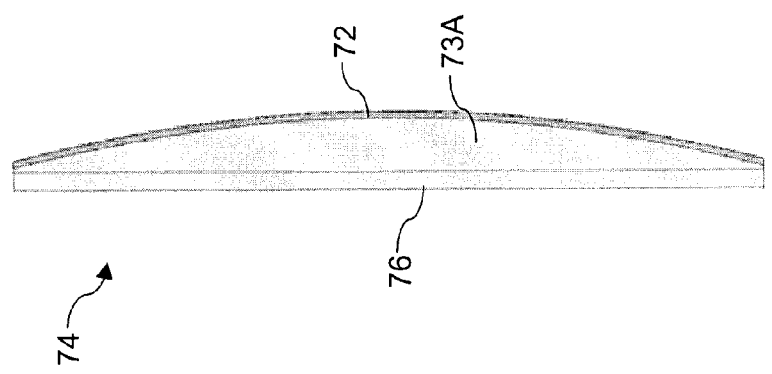

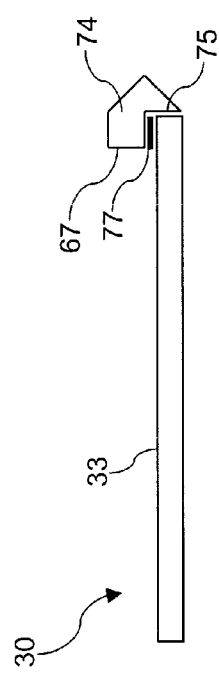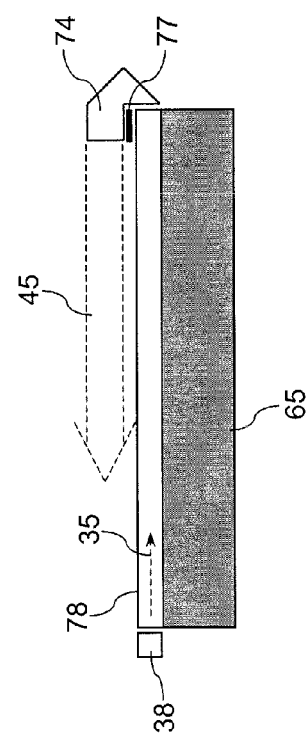

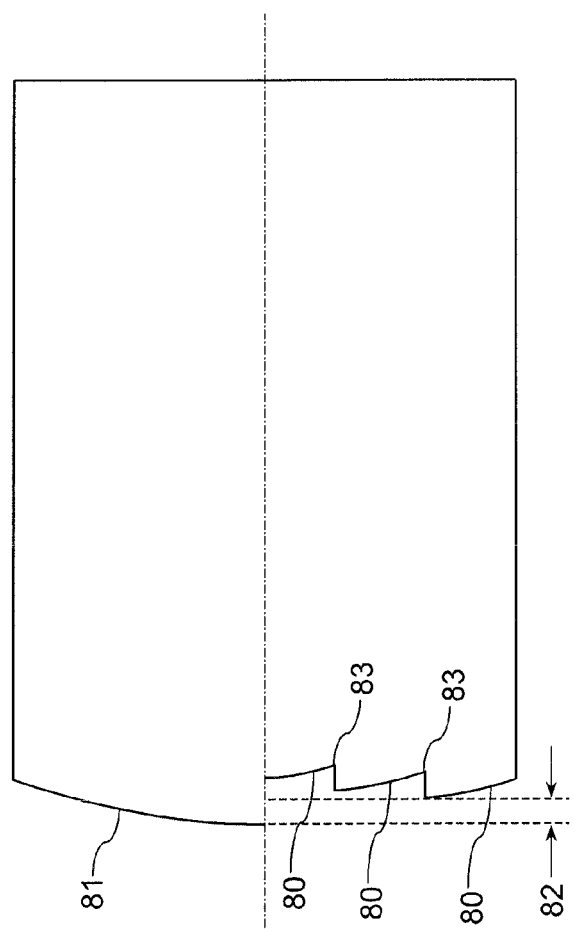

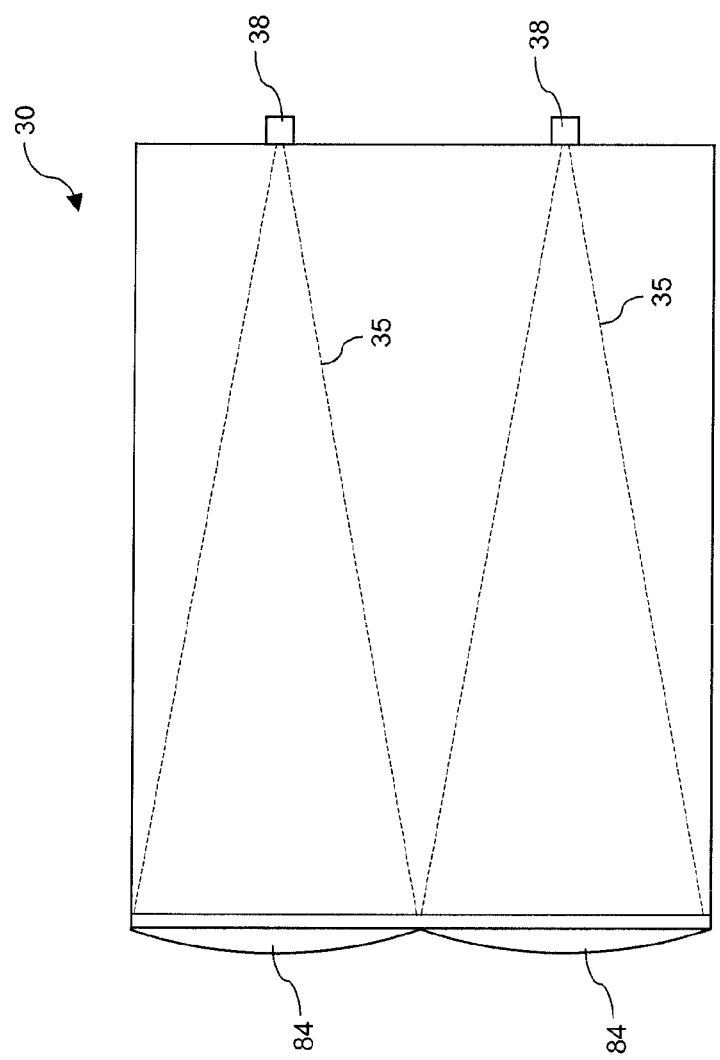

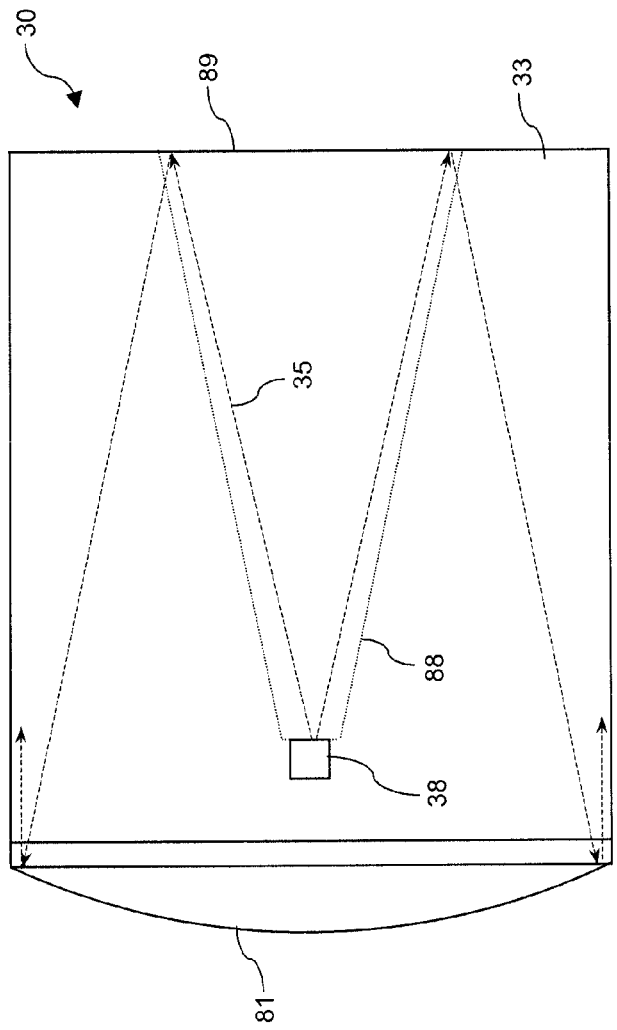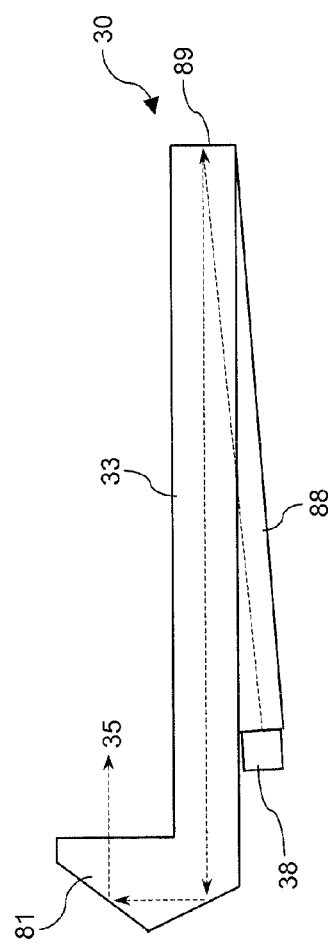

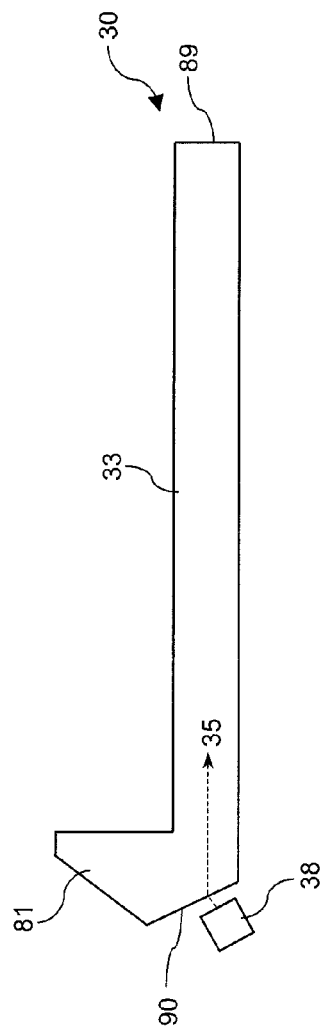
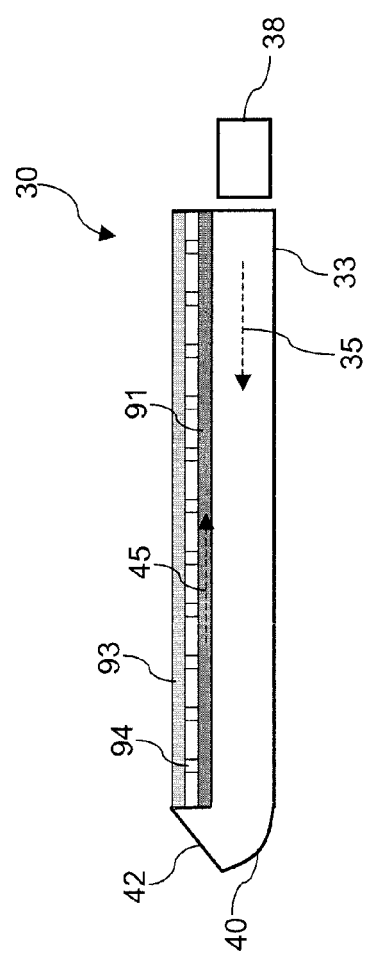

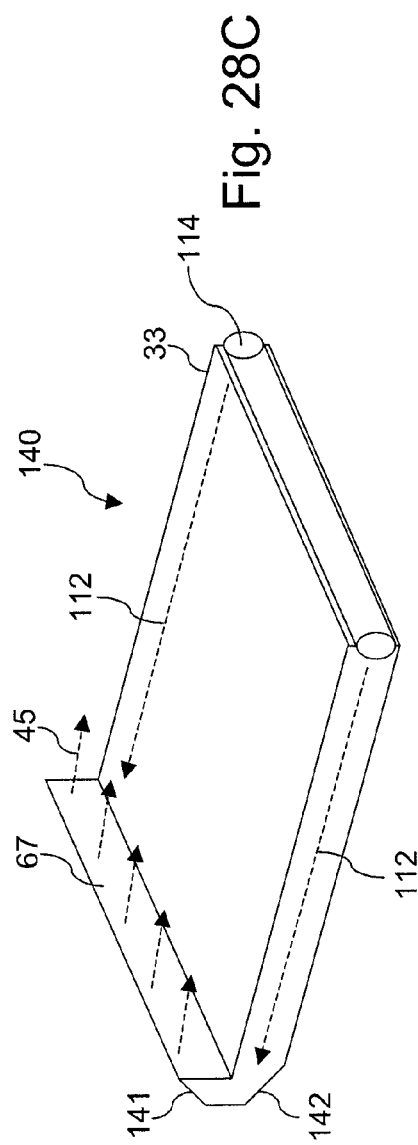
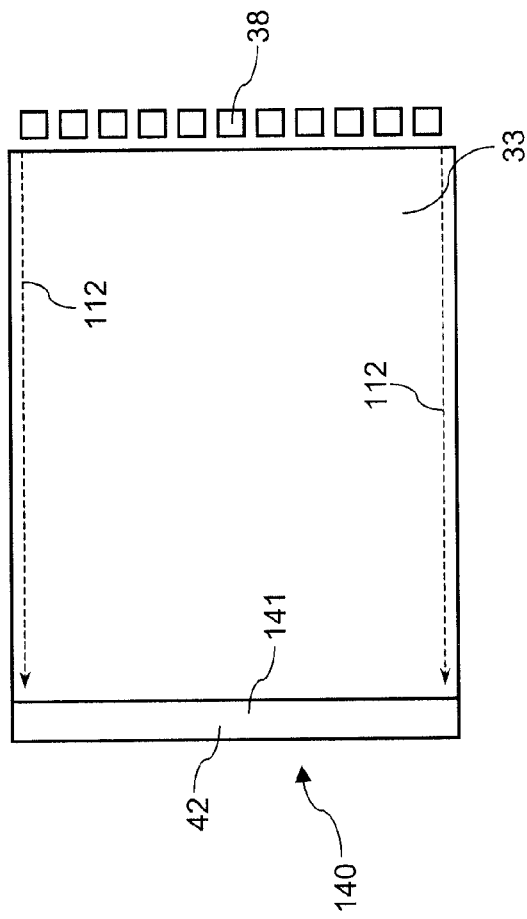
Fig. 28C
Fig. 28D

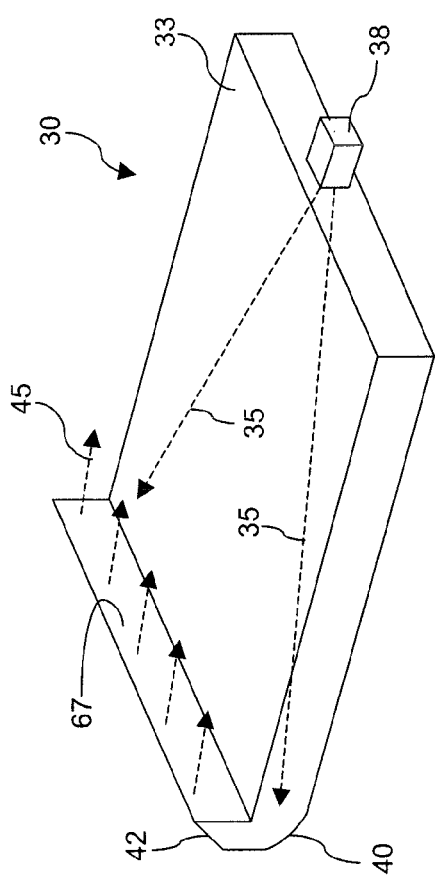
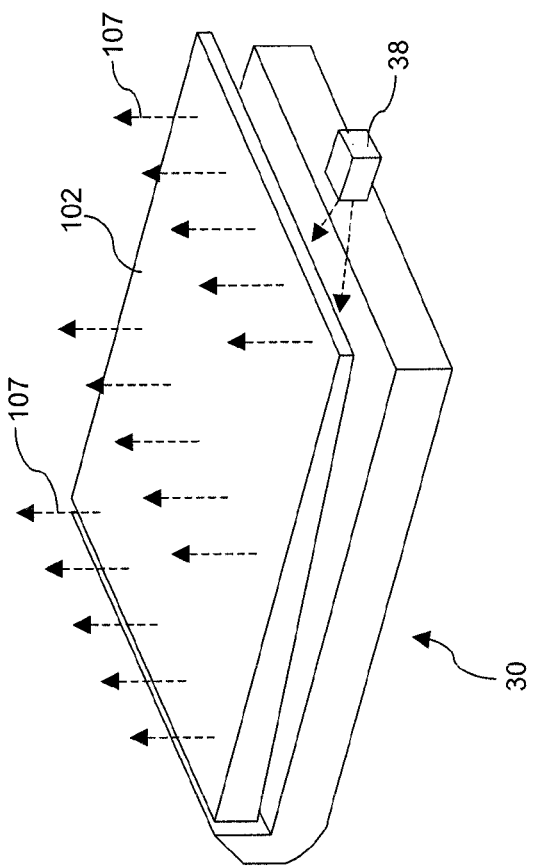
Fig. 32A
Fig. 32B

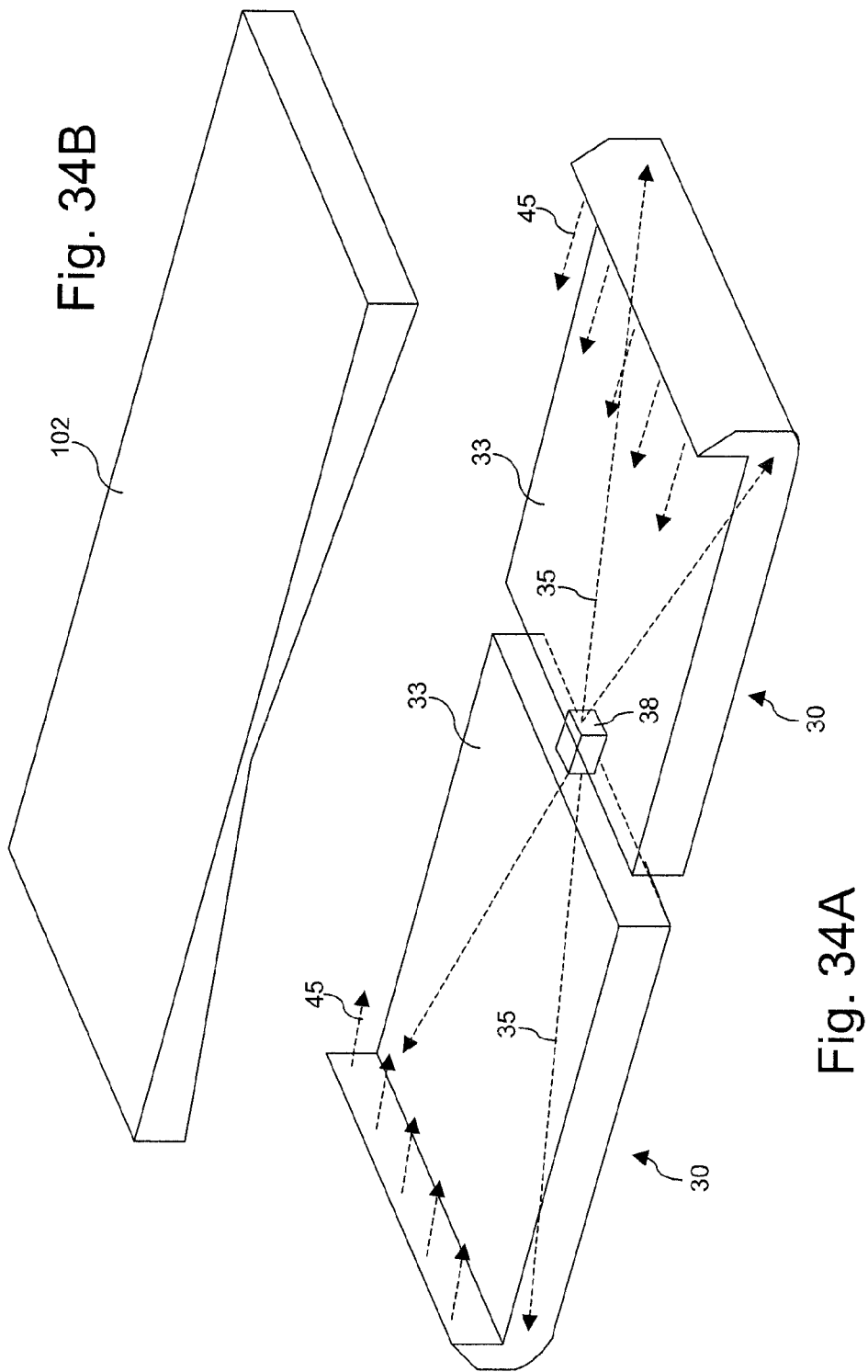

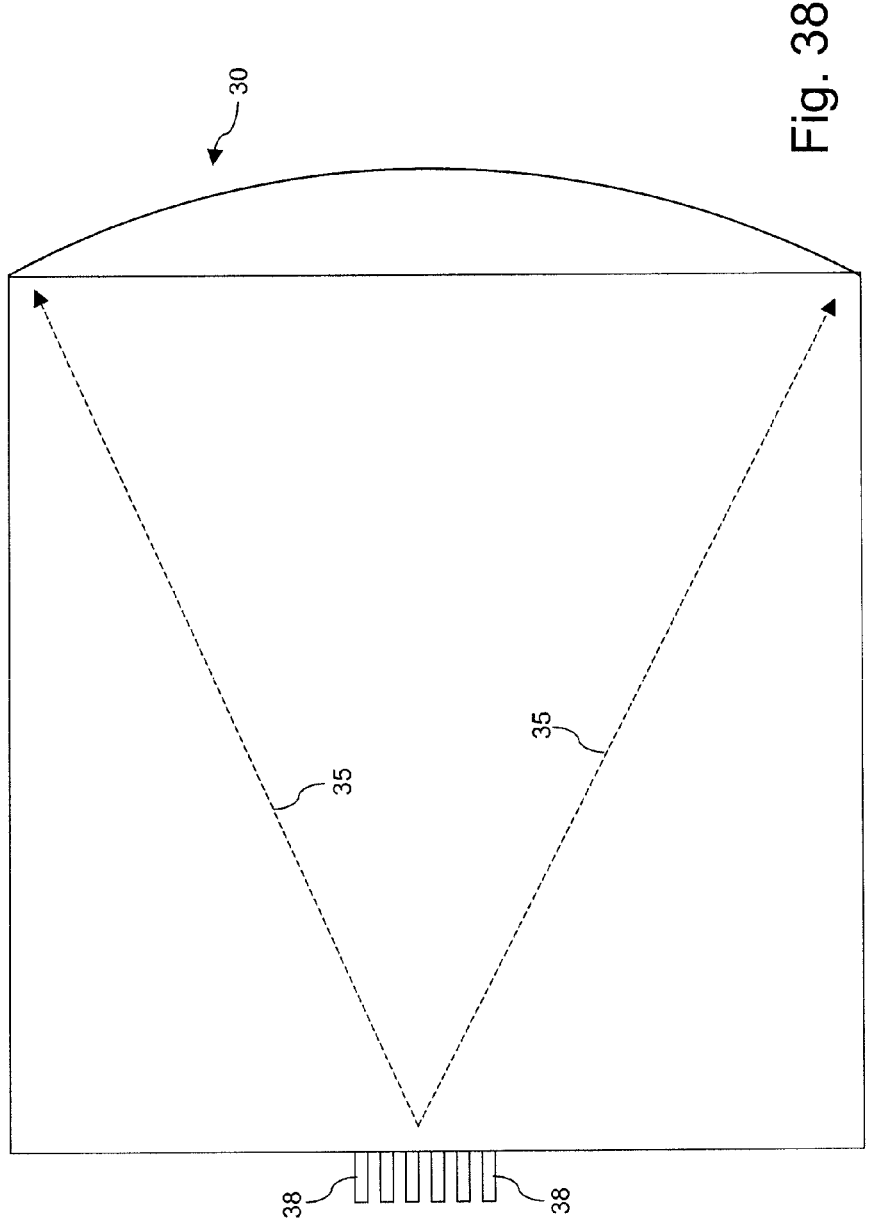

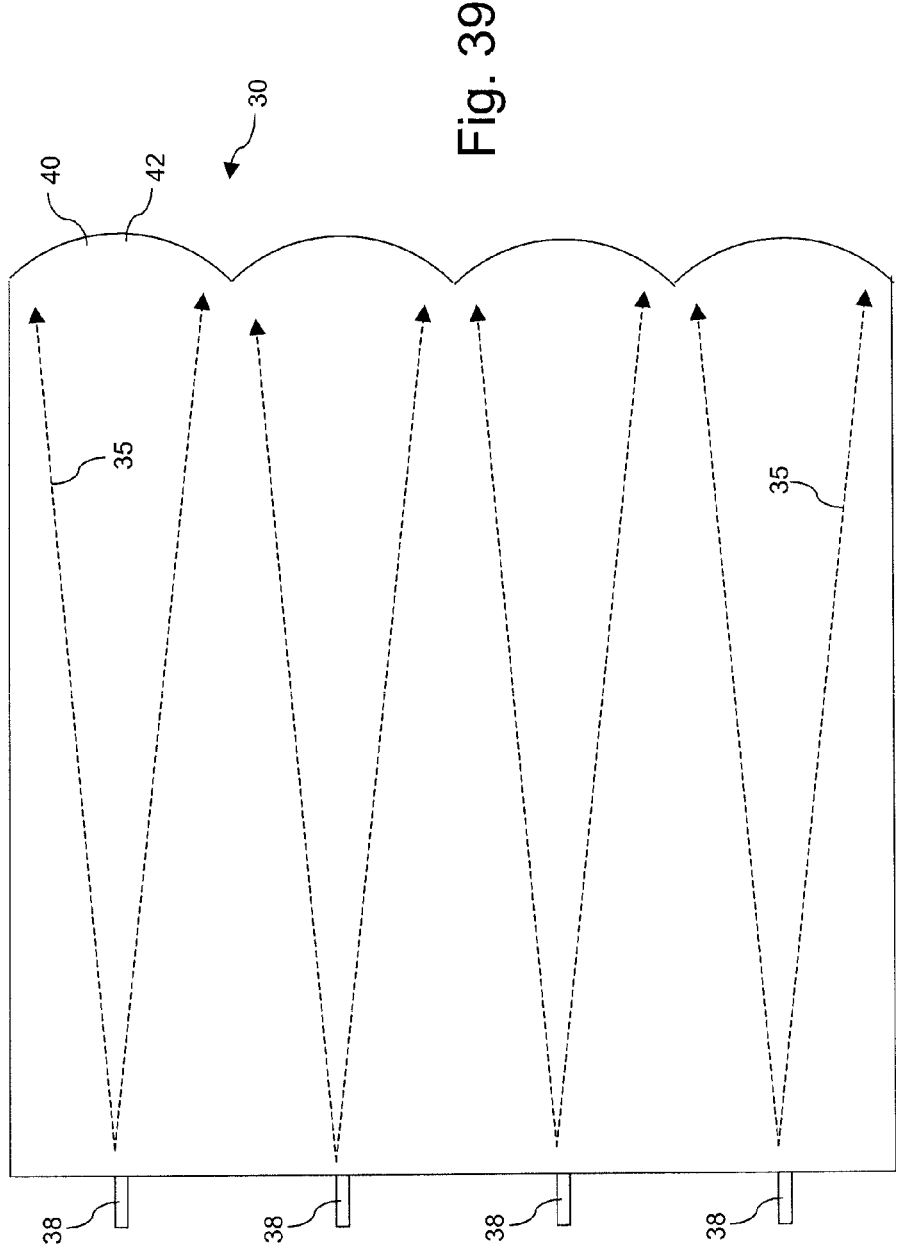

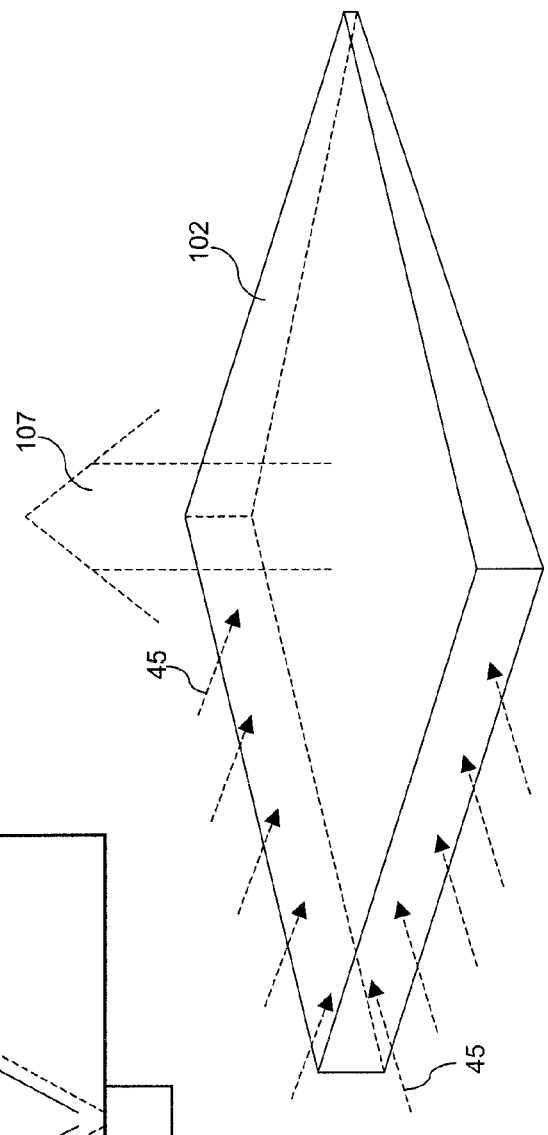
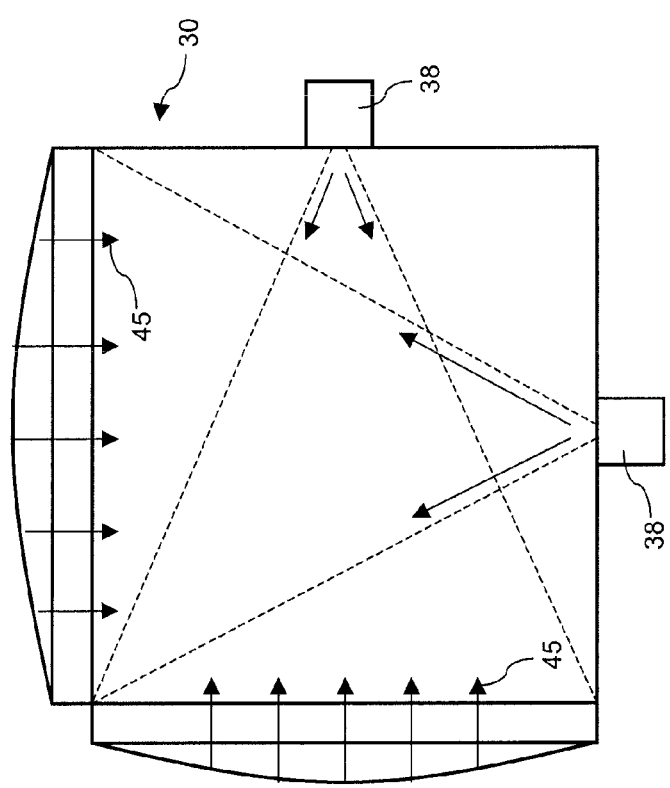

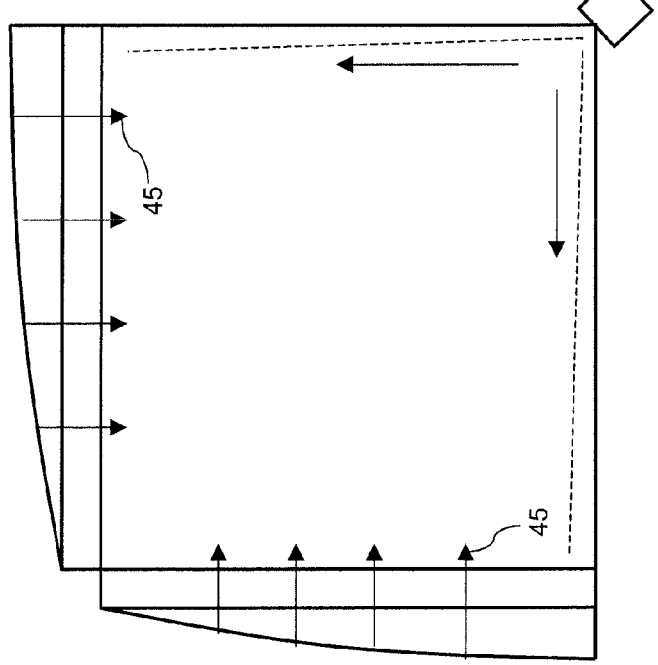
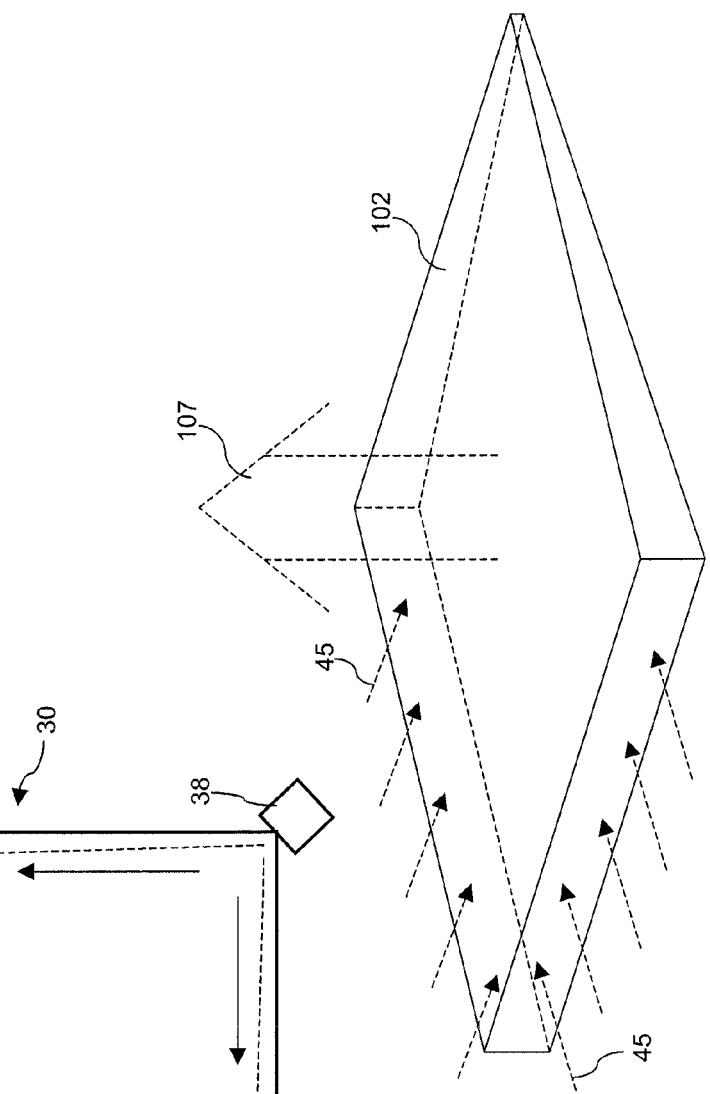
Fig. 41A
Fig. 41B

TRANSMISSIVE BODY

CROSS-REFERENCE TO RELATED APPLICATIONS

This application claims priority under 35 USC 119(e) from U.S. Provisional Patent Application No. 60/917,567 filed May 11, 2007, and from U.S. Provisional Patent Application No. 60/971,696 filed Sep. 12, 2007. The contents of both applications are incorporated herein by reference.

FIELD OF THE DISCLOSURE

In certain embodiments, the present disclosure relates to input devices, and in particular, optical touch input devices. In other embodiments, the present disclosure relates to apparatus for illuminating a display. In further embodiments, the present disclosure relates to combined input devices and apparatus for illuminating a display. However, it will be appreciated that the disclosure is not limited to these particular fields of use.

BACKGROUND OF THE DISCLOSURE

Any discussion of the prior art throughout the specification should in no way be considered as an admission that such prior art is widely known or forms part of the common general knowledge in the field.

Touch input devices or sensors for computers and other consumer electronics devices such as mobile phones, personal digital assistants (PDAs) and hand-held games are highly desirable due to their relative ease of use. In the past, a variety of approaches have been used to provide touch input devices. The most common approach uses a flexible resistive overlay, although the overlay is easily damaged, can cause glare problems, and tends to dim the underlying screen, requiring excess power usage to compensate for such dimming. Resistive devices can also be sensitive to humidity, and the cost of the resistive overlay scales quadratically with perimeter. Another approach is the capacitive touch screen, which also requires an overlay. In this case the overlay is generally more durable, but the glare and dimming problems remain.

In yet another common approach, a matrix of infrared light beams is established in front of a display, with a touch detected by the interruption of one or more of the beams. Such optical touch input devices have long been known (see U.S. Pat. No. 3,478,220 and U.S. Pat. No. 3,673,327), with the beams generated by arrays of optical sources such as light emitting diodes (LEDs) and detected by corresponding arrays of detectors (such as phototransistors). They have the advantage of being overlay-free and can function in a variety of ambient light conditions (U.S. Pat. No. 4,988,983), but have a significant cost problem in that they require a large number of source and detector components, as well as supporting electronics. Since the spatial resolution of such systems depends on the number of sources and detectors, this component cost increases with display size and resolution. Usually, the optical sources and detectors oppose each other across the display, although in some cases (disclosed for example in U.S. Pat. No. 4,517,559, U.S. Pat. No. 4,837,430 and U.S. Pat. No. 6,597,508) they are located on the same side of the display, with the return optical path provided by a reflector on the opposite side of the display.

An alternative optical touch input technology, based on integrated optical waveguides, is disclosed in U.S. Pat. No. 6,351,260, U.S. Pat. No. 6,181,842 and U.S. Pat. No. 5,914, 709. The basic principle of such a device is shown in FIG. 1. In this design, integrated optical waveguides 10 conduct light from an optical source 11 to integrated in-plane lenses 16 that collimate the light in the plane of a display and/or input area 13 and launch an array of light beams 12 across that display and/or input area 13. The light is collected by a second set of integrated in-plane lenses 16 and integrated optical waveguides 14 at the other side of the display and/or input area, and conducted to a position-sensitive (i.e. multi-element) detector 15. A touch event (e.g. by a finger or stylus) cuts one or more of the beams of light and is detected as a shadow, with position determined from the particular beam(s) blocked by the touching object. That is, the position of any physical blockage can be identified in each dimension, enabling user feedback to be entered into the device. Preferably, the device also includes external vertical collimating lenses (VCLs) 17 adjacent to the integrated in-plane lenses on each side of the input area, to collimate the light in the direction perpendicular to the plane of the input area.

As shown in FIG. 1, the touch input devices are usually two-dimensional and rectangular, with two arrays (X, Y) of transmit waveguides 10 along adjacent sides of the input area, and two corresponding arrays of receive waveguides 14 along the other two sides of the input area. As part of the transmit side, in one embodiment light from a single optical source 11 (such as an LED or a vertical cavity surface emitting laser (VCSEL)) is distributed to a plurality of transmit waveguides 10 forming the X and Y transmit arrays via some form of optical splitter 18, for example a 1×N tree splitter. The X and Y transmit waveguides are usually arranged on an L-shaped substrate 19, and the X and Y receive waveguides arranged on a similar L-shaped substrate, so that a single source and a single position-sensitive detector can be used to cover both X and Y dimensions. However in alternative embodiments, a separate source and/or detector may be used for each of the X and Y dimensions. Additionally, the waveguides may be protected from the environment by a bezel structure that is transparent at the wavelength of light used (at least in those portions through which the light beams 12 pass), and may incorporate additional lens features such as the abovementioned VCLs. Usually the sensing light is in the near IR, for example around 850 nm, in which case the bezel is preferably opaque to visible light.

For simplicity, only four pairs of transmit and receive waveguides per dimension are shown in FIG. 1. Generally there will be many more pairs per dimension, closely spaced so that the light beams 12 substantially cover the input area 13.

Compared to touch input devices with paired arrays of sources and detectors, waveguide-based devices have a significant cost advantage because of the greatly reduced number of optical sources and detectors required. Nevertheless, they still suffer from a number of drawbacks.

Firstly, because touch functionality is being increasingly common in consumer electronics devices such as mobile phones, handheld games and personal digital assistants (PDAs), there is a continuing requirement to reduce costs. Even if relatively inexpensive waveguide materials and fabrication techniques (such as curable polymers patterned by a photolithographic or moulding process) are used, the transmit and receive waveguide arrays still represent a significant fraction of the cost of the touch input device. Secondly there is a signal-to-noise problem: because the transmit waveguides are small (typically they have a square or rectangular cross section with sides of order 10 m), it is difficult to couple a large amount of signal light into them from the optical source. Since only a fraction of this light will be captured by the receive waveguides, the system as a whole is vulnerable to noise from ambient light, especially if used in bright sunlight. Thirdly, because the device uses discrete beams 12, the transmit and receive waveguides need to be carefully aligned during assembly. A similar alignment requirement applies to the older optical touch input devices with arrays of discrete sources and detectors.

Inspection of the waveguide-based touch input device shown in FIG. 1 reveals that positional information for a touching object is encoded on the receive waveguides 14; that is to say, the position of the object is determined from those particular receive waveguides that receive less or no light and convey that condition to the respective elements of the multi-element detector 15. The transmit side is less critical, and two sheets of light propagating in the X and Y directions can be used in place of the grid of discrete beams 12.

An alternative configuration disclosed in U.S. Pat. No. 7,099,553 and shown schematically in FIG. 2 provides a sheet of light, while still using a minimal number of optical sources, by replacing the transmit waveguides with a single bulk optics waveguide in the form of a light pipe 21 with a plurality of reflective facets 22. In operation, light from an optical source 11 is launched into an input face of the light pipe 21, optionally with the assistance of a lens 23, and this light is deflected by the reflective facets 22 to produce sheets of light 45 that traverse the input area 13 towards the receive waveguides 14. As shown in FIG. 2, the light pipe 21 is an L-shaped item encompassing both transmit sides of the input area 13, with a turning mirror 24 at its apex. In a minor variation there may be separate, substantially linear light pipes for each of the transmit sides. Advantageously, the light pipe 21 may comprise a polymer material formed by injection moulding for example, and as such will be considerably less expensive to fabricate than an array of waveguides. It will be further appreciated that since the light pipe 21 is a bulk optics component, it will be relatively straightforward to couple light into it with high efficiency from an optical source 11, thereby improving the signal-to-noise ratio.

As mentioned in U.S. Pat. No. 7,099,553, the output faces 25 of the light pipe 21 can be shaped with cylindrical curvature to form lenses 26 that collimate the light sheets 45 in the vertical (i.e. out-of-plane) direction, obviating the need for any separate vertical collimating lens. This will further reduce the Bill of Materials, and possibly also the assembly costs.

Light pipes with a plurality of reflective facets are commonly used for distributing light from a single light source for illumination purposes (see for example U.S. Pat. No. 4,068, 121). Two-dimensional versions such as a substantially planar light guide plate with a plurality of reflective facets on one surface are also known for display backlighting, as disclosed in U.S. Pat. No. 5,050,946 for example. In most known light pipes and light guide plates, the reflective facets are formed along an exterior edge or surface. The light pipe 21 disclosed in U.S. Pat. No. 7,099,553 has a rather different form, where the facets 22 are essentially internal to the light pipe body, and are stepped in height so that each facet only reflects a small fraction of the light guided within the light pipe. An advantage with this design is that the width 27 of the light pipe is relatively small, which is important for touch input devices where the "bezel width" around a display should not be excessive. However it has the significant disadvantage of being a complicated design, with numerous sharp corners and concave portions that will be extremely difficult to reproduce accurately via injection moulding. A second problem is that, analogous to the well-known principle of single slit diffraction, the divergence angle of a light beam reflected off a facet will depend on the height of that facet. Therefore the incremental height of the facets 22 in the light pipe 21 will cause the reflected beams to have incrementally varying divergence in the out-of-plane direction, such that a simple cylindrical lens 26 will not be able to completely collimate the light sheets 45.

A much simpler optical touch input device where a minimal number of optical sources are used to generate a sheet of sensing light is disclosed in U.S. Pat. No. 4,986,662. As illustrated in FIG. 2A, a touch input device includes a rectangular frame 91 with an optical source 11 and an array of detectors 56 along two sides and parabolic reflectors 92 on the opposing two sides. Light 35 emitted from each optical source propagates across the input area 13 towards a respective parabolic reflector, and is reflected back across the input area as sheets of light 45 in the X and Y dimensions. Unfortunately this simple configuration has the disadvantage that in many parts of the input area, a touch object 60 will block the outgoing light 35, complicating the detection algorithms.

The present disclosure overcomes or ameliorates at least one of the disadvantages of the prior art, or provides a useful alternative.

SUMMARY OF THE DISCLOSURE

According to a first aspect the present disclosure provides a transmissive body for an input device, said body comprising:

a collimation element adapted to substantially collimate an optical signal; and a redirection element adapted to substantially redirect an optical signal, wherein said elements are arranged to receive a substantially planar optical signal and collimate and redirect said optical signal to produce a substantially collimated planar signal.

The elements may be arranged to receive a substantially planar optical signal and collimate, redirect and transmit said optical signal to produce a substantially collimated planar signal. The elements may be arranged to receive a substantially planar optical signal propagating in a first plane and redirect the optical signal as a substantially collimated planar signal into a second plane different from the first plane.

In one embodiment, the first and second planes are substantially parallel. In another Embodiment, the substantially collimated planar signal is redirected into one or more planes substantially parallel to and spaced from the first plane. In yet further embodiments, the substantially collimated planar signal is redirected toward the source of the substantially planar optical signal.

In some embodiments according to the first aspect, the transmissive body is formed from a unitary piece of plastics material substantially transparent to light of the infrared or visible region of the spectrum and optionally opaque to ambient visible light.

In one embodiment, the transmissive body according to the first aspect may receive an optical signal in a substantially planar form. In another embodiment, the transmissive body according to the first aspect may receive light from a plurality of light sources, such as an array of LEDs. In yet a further embodiment, the transmissive body according to the first aspect may receive light from a cold cathode fluorescent lamp (CCFL).

According to a second aspect, the present disclosure provides a transmissive body for an input device, said body comprising:

(a) a transmissive element adapted to receive, confine and transmit an optical signal in planar form; and (b) a collimation and redirection element adapted to substantially collimate and redirect an optical signal;
wherein said elements are arranged to receive an optical signal from an optical source and transmit, collimate and redirect said optical signal to produce a substantially collimated signal in a substantially planar form.

According to a third aspect, the present disclosure provides a transmissive body for an input device, said body comprising:
(a) a transmissive element adapted to receive, confine and transmit an optical signal in planar form;
(b) a collimation element adapted to substantially collimate an optical signal; and
(c) a redirection element adapted to redirect an optical signal,
wherein said elements are arranged to receive an optical signal from an optical source and transmit, collimate and redirect said optical signal to produce a substantially collimated signal in a substantially planar form.

The transmissive element may be substantially planar, such as in the form of a slab. However it will be appreciated that the transmissive element may be in any form provided that: 1.) the transmissive element is adapted to receive an optical signal from an optical source, 2.) the transmissive element is adapted to transmit the signal in planar form, and 3.) the transmissive element confines the optical signal within its outer periphery. In one preferred embodiment the optical source is a point source of diverging light (as discussed further below), optically coupled to a substantially planar transmissive element, such that the light is confined in the narrow dimension of the transmissive element but diverges freely in the broad dimension of the transmissive element. The collimation element and/or the redirection element span the full width of the transmissive element along a side opposing the optical source, and ideally the light will diverge sufficiently within the transmissive element so as to fill this opposing side. If necessary a lens can be inserted to ensure that this occurs.

In one embodiment, the transmitted substantially collimated planar signal is redirected in a plane substantially coplanar with the transmissive element if present or the received substantially planar optical signal. For example the collimated planar signal may be redirected to one side of the transmissive body. However, in alternative embodiments the substantially collimated planar signal is redirected into one or more planes substantially parallel to and spaced from the transmissive element. In this embodiment the collimated planar signal may be directed back towards the optical source or away from the optical source. Whilst it is preferable to redirect the entire substantially collimated planar signal, further embodiments are contemplated in which only a portion (or portions) of the substantially collimated planar signal are redirected. In a preferred embodiment the substantially collimated planar signal is redirected into free space. In an alternative embodiment the substantially collimated planar signal is redirected into a planar waveguide. If the substantially collimated planar signal is redirected in a plane substantially parallel to the transmissive element, this planar waveguide can be integrated with the transmissive element.

In some embodiments the collimation element and/or the redirection element are in the form of a mirror or a lens. However, the collimation element and/or the redirection element may be a plurality of collimation elements and redirection elements adapted to produce a plurality of substantially collimated signals in planar form from a single optical source.

The optical source may be a point source emitting a diverging optical signal, for example an LED. In this case the collimation element is preferably a substantially parabolic reflector or a substantially elliptical lens, shaped and positioned such that its focus is substantially coincident with the optical source. The skilled person will appreciate that the aforementioned configuration enables the transmissive body of the disclosure to provide collimation of a diverging optical signal into substantially parallel rays of light, i.e. collimation of the optical signal.

The transmissive body may be formed as either a unitary body or a plurality of bodies, depending on the embodiment. For example, for embodiments according to the first aspect, the transmissive body may be a unitary body or a pair of bodies. For embodiments according to the second or third aspects, the transmissive body may be:
1.) a unitary body comprising all three of the collimation, redirection and transmissive elements,
2.) a pair of bodies wherein one of the bodies comprises any two of the collimation, redirection and transmissive elements and the other of the bodies comprises the remaining element, or
3.) a triad of bodies, wherein each body comprises only one of the collimation, redirection and transmissive elements.

In some embodiments, the collimation element and the redirection element are both optically downstream of the transmissive element. However, it will be appreciated that one or both of the collimation element and the redirection element may be optically upstream of the transmissive element. However, as the skilled person will be aware the relative positioning and pointing accuracy of the optical source in this latter embodiment requires significantly greater precision to ensure that a sufficient quantity of the optical signal is transmitted and that the optical signal is sufficiently collimated.

In a first construction, a single optical source is provided which is optically coupled to a transmissive body according to the first aspect. It will be appreciated that the transmissive body provides a single sheet or lamina of substantially collimated planar optical signal. This substantially collimated planar signal may then be directed into one or more light detecting elements for detecting an input; the input being determined by an interruption of the collimated planar signal.

In a further construction a pair of optical sources may be included and oriented substantially perpendicularly to each other on adjacent sides of a transmissive element. Pairs of collimation and redirection elements may also be provided on mutually opposing sides of the transmissive element to each of the optical sources, thereby providing a pair of substantially collimated planar signals that propagate in substantially perpendicular directions. In one embodiment the collimated planar signals are coplanar, however the collimated planar signals may be in mutually spaced apart parallel planes.

In yet a further construction, a single optical source is optically coupled to the transmissive element, with pairs of collimation and redirection elements provided and positioned to produce a pair of substantially collimated planar signals that, in one arrangement, propagate in substantially perpendicular directions. Again, such collimated planar signals may be coplanar or in mutually spaced apart parallel planes.

It will be appreciated that a display may be positioned between the substantially collimated planar signal and the transmissive element or, in the case where the transmissive element is transparent, a display may be positioned on the opposite side of the transmissive element to the substantially collimated planar signal. In this latter embodiment the transmissive element itself forms the touch surface.

In yet a further construction, a single optical source is optically coupled to a transmissive element, and the collimation and redirection elements redirect the light into a planar waveguide provided on a surface of the transmissive element. In this embodiment the planar waveguide forms the touch surface, and input is determined by a reduction in the amount of light guided in the planar waveguide.

According to a fourth aspect, the present disclosure provides a signal production device for an input device, comprising:
an optical source for providing an optical signal; and
a transmissive body comprising:
(a) a transmissive element adapted to receive, confine and transmit said optical signal in planar form;
(b) a collimation element adapted to substantially collimate said optical signal; and
(c) a redirection element adapted to redirect said optical signal,
wherein said elements are arranged to receive said optical signal and
transmit, collimate and redirect said optical signal to produce a substantially collimated signal in a substantially planar form.

According to a fifth, aspect the present disclosure provides an input device, comprising:
an optical source for providing an optical signal; and
(a) a transmissive element adapted to receive, confine and transmit an optical signal in planar form;
(b) a collimation element adapted to substantially collimate an optical signal; and
(c) a redirection element adapted to redirect an optical signal,
wherein said elements are arranged to receive said optical signal and
transmit, collimate and redirect said optical signal to produce a substantially collimated signal in a substantially planar form, said substantially collimated planar signal being directed to at least one light detecting element for detecting an input.

The light detecting element is adapted to receive at least a portion of the substantially collimated planar signal for detecting an input. The light detecting element preferably comprises at least one optical waveguide in optical communication with at least one detector.

In some embodiments, the transmissive body is formed from a unitary piece of plastics material substantially transparent to the signal light. This signal light may be in the infrared region of the spectrum, in which case the plastics material may optionally be opaque to ambient visible light. In these embodiments the transmissive body is preferably injection moulded. However, it will be appreciated that the transmissive body, or even portions of the transmissive body such as the transmissive element, the collimation element and/or the redirection element could be fabricated from other materials such as glass, and optically joined together. In one particularly preferred embodiment, the transmissive element is composed of glass and the collimation and redirection elements are together composed of a unitary piece of injection moulded plastics material.

According to a sixth aspect, the present disclosure provides a method for producing an optical signal in substantially collimated planar form, said method comprising the steps of:
providing an optical signal from an optical source;
receiving, confining and transmitting an optical signal in planar form;
substantially collimating an optical signal; and
redirecting an optical signal.

A substantially planar transmissive element may confine and transmit the optical signal in a planar form, a collimation element collimates the optical signal in planar form, and a redirection element redirects the substantially collimated planar signal. In this aspect, the transmissive element, collimation element and redirection element define the transmissive body.

The method according to the sixth aspect further comprises the step of redirecting the substantially collimated planar signal into a plane substantially parallel to the transmissive element. The method may further comprise the step of redirecting the substantially collimated planar signal into one or more planes substantially parallel to and spaced from the transmissive element. In one embodiment the method comprises the step of redirecting the substantially collimated planar signal back towards the optical source, which is a point source providing a diverging optical signal. The collimation element may include one or more substantially parabolic reflectors or one or more substantially elliptical lenses, and wherein each of the one or more substantially parabolic reflectors or elliptical lenses is shaped and positioned such that its focus is substantially coincident with the point source.

In another embodiment, the method comprises the step of providing a pair of optical sources and corresponding pairs of collimation elements and redirection elements for providing a pair of substantially collimated planar signals propagating in substantially perpendicular directions.

In another embodiment, the method further comprises the step of providing a single optical source and pairs of collimation elements and redirection elements for providing a pair of substantially collimated planar signals propagating in substantially perpendicular directions.

According to a seventh aspect, the present disclosure provides a method for producing an optical signal in substantially collimated planar form, the method comprising the steps of:
(a) providing an optical signal from an optical source; and
(b) optically coupling the optical source into a transmissive body according to the first, second or third aspects.

The present disclosure provides significant advantages over the prior art. For example, one significant issue with prior art devices relates to the need to align the transmitters with the receivers in the plane of the input area, whether the transmitters and receivers are discrete optical components as in U.S. Pat. No. 3,478,220 or waveguides as in U.S. Pat. No. 5,914,709. In contrast, since the transmit signal of the instant disclosure is a sheet/lamina of substantially collimated light, preferably in free space but alternatively guided within a planar waveguide, there is now no requirement to align receivers with transmitters in this plane. Each receiver simply receives a portion of light being directed at it and any of its neighbours, and registers interruption of the sheet of light as an input.

According to an eighth aspect, the present disclosure provides an assembly for an input device and for illuminating a display, said assembly comprising: a transmissive body according to the second or third aspects for supplying an optical signal for said input device, and a distribution element adjacent said transmissive element for receiving and distributing light from a light source to said display thereby illuminating said display.

According to a ninth aspect, the present disclosure provides an assembly for an input device and for illuminating a display, said assembly comprising: a transmissive body comprising a transmissive element adapted to receive an optical signal from an optical source and confine and transmit said optical signal in substantially planar form into a collimation and redirection element adapted to substantially collimate and redirect said substantially planar optical signal for supplying said signal for said input device, and a distribution element adjacent said transmissive element for receiving and distributing light from a light source to said display thereby illuminating said display.

A cladding layer may be disposed between said transmissive element and the distribution element for reducing leakage of light from the distribution element into the transmissive element, and for reducing leakage of the optical signal from the transmissive element into the distribution element.

In one embodiment, the distribution element is positioned such that the light source for supplying light to the distribution element and the optical source for supplying the optical signal to the transmissive element are positioned on the same side of the transmissive element. In an alternative embodiment, the distribution element is positioned such that the light source for supplying the light to the distribution element and the optical source for supplying the optical signal to the transmissive element are positioned on mutually opposed sides of the transmissive element.

The optical signal may include one or more predetermined wavelengths from the infrared region of the spectrum and said light includes one or more predetermined wavelengths from the visible region of the spectrum. In an alternative embodiment, the optical signal and the light each include one or more predetermined wavelengths from the visible region of the spectrum.

In one embodiment the display is positioned above the transmissive element. However, the display may be positioned beneath the transmissive element. The light source for supplying the light may be a cold cathode fluorescent lamp or an array of LEDs, and the optical source for supplying the optical signal may be an LED or a group of LEDs.

According to a tenth aspect, the present disclosure provides an assembly for an input device and for illuminating a display, said assembly comprising a transmissive body according to the second or third aspects, and one or more light sources for producing light, said light source(s) positioned beneath said transmissive element to thereby illuminate said display through said transmissive element.

According to an eleventh aspect, the present disclosure provides an assembly for an input device and for illuminating a display, said assembly comprising a transmissive body comprising a transmissive element adapted to receive an optical signal from an optical source and confine and transmit said optical signal in substantially planar form into a collimation and redirection element adapted to substantially collimate and redirect said substantially planar optical signal, and one or more light sources for producing light, said light source(s) positioned beneath said transmissive element to thereby illuminate said display through said transmissive element.

The assembly may further comprise a cladding layer disposed between the one or more light sources and the transmissive element for reducing leakage of light from the transmissive element into the one or more light sources, or for reducing interaction between the optical signal in the transmissive element and the one or more light sources, wherein said one or more light sources are LEDs. The LEDs may produce one or more predetermined wavelengths from the visible region of the spectrum. The display may be positioned above the transmissive element.

According to a twelfth aspect, the present disclosure provides a method for producing a signal for an input device and for illuminating a display, said method comprising the steps of: providing an optical signal from an optical source; receiving, confining and transmitting said optical signal in planar form; substantially collimating said optical signal; redirecting said substantially collimated optical signal for said input device; providing light from a light source; and receiving and distributing said light to said display thereby illuminating said display.

According to a thirteenth aspect, the present disclosure provides a method for producing a signal for an input device and for illuminating a display, said method comprising the steps of: optically coupling a transmissive body according to the first, second or third aspects with an optical source for supplying an optical signal for said input device; coupling a distribution element with said transmissive body; and optically coupling said distribution element with a light source for supplying light for illuminating said display.

According to a fourteenth aspect, the present disclosure provides a method for producing a signal for an input device and for illuminating a display, said method comprising the steps of: providing an optical signal from an optical source; receiving, confining and transmitting said optical signal in planar form; substantially collimating said optical signal; redirecting said substantially collimated optical signal for said input device; providing light from one or more light sources; and distributing said light to said display thereby illuminating said display.

According to a fifteenth aspect, the present disclosure provides an assembly for illuminating a display, said assembly comprising: a transmissive body comprising a transmissive element adapted to receive, confine and transmit light in substantially planar form into a collimation and redirection element adapted to substantially collimate and redirect said substantially planar light, and a distribution element adapted to receive and distribute said substantially planar collimated light to said display thereby illuminating said display.

According to a sixteenth aspect, the present disclosure provides an assembly for illuminating a display, said assembly comprising a transmissive body according to the first, second or third aspects optically coupled to a distribution element adapted to distribute said substantially planar collimated light to said display thereby illuminating said display.

According to a seventeenth aspect, the present disclosure provides a method for illuminating a display, said method comprising the steps of: providing light from a light source; receiving, confining and transmitting said light in substantially planar form; substantially collimating and redirecting said light; and distributing said substantially planar collimated light to said display thereby illuminating said display.

According to an eighteenth aspect the present disclosure provides a method for illuminating a display with light from a light source, said method comprising the steps of: optically coupling said light source with a transmissive body according to the first, second or third aspects; and optically coupling said transmissive body with a distribution element for distributing said substantially planar collimated light to said display thereby illuminating said display.

According to a nineteenth aspect, the present disclosure provides a transmissive body for an input device and for illuminating a display, said body comprising: a transmission and distribution element adapted to receive, confine and transmit a first portion of a light signal in a substantially planar form to a redirection element adapted to redirect said substantially planar light signal for said input device, wherein said transmission and distribution element simultaneously distributes a second portion of said light signal to said display thereby illuminating said display.

In one embodiment of the transmissive body according to the nineteenth aspect the display may be positioned above the transmission and distribution element, however in an alternative embodiment the display may be positioned beneath the transmission and distribution element. In a related embodiment, the transmissive body for an input device and for illuminating a display may further comprise a touch surface transparent to the light signal positioned above the transmission and distribution element.

According to a twentieth aspect, the present disclosure provides an assembly for an input device and for illuminating a display, said assembly comprising: a transmissive element adapted to receive, confine and transmit light in substantially planar form to a redirection element adapted to redirect a first portion of said substantially planar light for said input device and to redirect a second portion of said substantially planar light for simultaneously supplying said light to a distribution element for illuminating said display.

In one embodiment of the assembly according to the twentieth aspect the display and the distribution element may be positioned above the transmissive element. Alternatively, the display may be positioned beneath the transmissive element and the distribution element positioned above the transmissive element. In a related embodiment, the assembly may further comprise a touch surface transparent to the light positioned above the distribution element. The light may be supplied by a cold cathode fluorescent lamp or an array of LEDs.

According to a twenty-first aspect, the present disclosure provides a method for producing a signal for an input device and for illuminating a display, said method comprising the steps of: providing light from a light source; receiving, confining and transmitting said light in a substantially planar form; redirecting a first portion of said substantially planar light for said input device and simultaneously distributing a second portion of said substantially planar light to said display thereby illuminating said display.

According to a twenty-second aspect, the present disclosure provides a method for producing a signal for an input device and for illuminating a display, said method comprising the steps of: providing light from a light source; receiving, confining and transmitting said light in a substantially planar form; redirecting a first portion of said substantially planar light for said input device and redirecting a second portion of said substantially planar light for simultaneously distributing said second portion to said display thereby illuminating said display.

According to a twenty-third aspect, the present disclosure provides an assembly for an input device comprising: a transmissive element adapted to receive an optical signal from an optical source and confine and transmit said optical signal in substantially planar form into a transmissive body according to the first aspect for collimating and redirecting said optical signal to produce a substantially collimated planar signal.

According to a twenty-fourth aspect, the present disclosure provides a signal production device for an input device comprising: an optical source for providing a collimated signal, and a transmissive body for capturing and redirecting said collimated signal in a substantially planar form. In one embodiment the signal source is a point source. However, in another embodiment the signal source is a line source. Preferably the signal source produces a collimated optical signal. Preferably the transmissive body includes a redirection element for receiving and redirecting an optical signal. Preferably the transmissive body includes a collimation element for receiving and collimating an optical signal. The transmissive body may include a transmissive element for capturing and transmitting an optical signal in a planar form.

Unless the context clearly requires otherwise, throughout the description and the claims, the words comprise, comprising, and the like are to be construed in an inclusive sense as opposed to an exclusive or exhaustive sense; that is to say, in the sense of including, but not limited to.

Other than in the operating examples, or where otherwise indicated, all numbers expressing quantities used herein are to be understood as modified in all instances by the term about. The examples are not intended to limit the scope of the disclosure.

BRIEF DESCRIPTION OF THE DRAWINGS

Embodiments of the disclosure will now be described, by way of example only, with reference to the accompanying drawings in which:

FIG. 3 shows a plan view of a transmissive body according to a first embodiment of the disclosure, shown optically coupled to an optical source and a substantially collimated planar signal being produced;

FIG. 4 is a side view of the apparatus as shown in FIG. 3;

FIG. 5B shows a plan view similar to that of FIG. 3, but with the optical source located in a slot in the transmissive element;

FIG. 7A is a view similar to FIG. 4 but showing the substantially collimated planar signal being redirected into a planar waveguide integrated with the transmissive element.

FIG. 7B is a view similar to FIG. 7A but showing a cladding layer between The planar waveguide and the transmissive element.

FIG. 8 is a view similar to FIG. 3 but showing a pair of optical sources oriented substantially perpendicularly to each other, and corresponding pairs of collimation and redirection elements for providing a pair of substantially collimated planar signals that propagate in substantially perpendicular directions;

FIG. 9 is a sectional side view of the transmissive body as shown in FIG. 8, showing the substantially collimated planar signals propagating in mutually spaced apart substantially parallel planes;

FIG. 10 is a plan view of a transmissive body having a single optical source and pairs of collimation and redirection elements for providing a pair of substantially collimated planar signals that propagate in substantially perpendicular directions;

FIG. 11 is a side view of the transmissive body as shown in FIG. 10, where the substantially collimated planar signals are coplanar;

FIG. 12 is a view similar to FIG. 8 but showing two detector arrays and an interruption of the substantially collimated planar signals by a touch event;

FIG. 13 is a side view of the apparatus as shown in FIG. 12;

FIG. 16 is a view similar to FIG. 13 but showing a display positioned on the opposite side of the transmissive element to the substantially collimated planar signal;

FIG. 17 is a view similar to FIG. 13, but showing a display positioned between n the substantially collimated planar signal and the transmissive element;

FIGS. 18A, 18B and 18C are plan, side and perspective views respectively of a transmissive body according to a first preferred embodiment;

FIGS. 19A, 19B and 19C are plan, side and perspective views respectively of a collimation/redirection element according to a second preferred embodiment;

FIG. 20 is a side view of a transmissive body including the collimation/redirection element of FIGS. 19A, 19B and 19C;

FIG. 21 is a side view of another transmissive body including the collimation/redirection element of FIGS. 19A, 19B and 19C;

FIG. 22 is a plan view of a transmissive body with a segmented parabolic reflector;

FIG. 23 is a plan view of a transmissive body with multiple parabolic reflector portions;

FIG. 25 is a plan view of a double pass transmissive body incorporating a tapered portion for signal input;

FIG. 26 is a side view of the transmissive body of FIG. 25;

FIG. 27 is a side view of a double pass transmissive body where the signal light is launched through a parabolic reflector;

FIG. 28 is a side view of a zero bezel height transmissive body;

FIG. 28C is a perspective view of the apparatus shown in FIG. 28A;

FIG. 28D is a similar view to that of FIG. 28A, but with an array of point sources approximating an extended light source;

FIGS. 32A and 32B are perspective views of a transmissive body according to the present disclosure coupled with a distribution element showing how light from a single light source such as an LED may be distributed from a distribution element for illuminating a display (not shown);

FIGS. 34A and 34B are similar to FIGS. 32A and 32B, but showing an exploded view of a distribution element and transmissive bodies according to the present disclosure for illuminating a display (not shown);

FIG. 38 is a plan view of a transmissive body according to the present disclosure showing a collection of multiple point light sources that effectively act as a single point source;

FIG. 39 is a plan view of a transmissive body according to the present disclosure showing an array of multiple light sources supplying light to corresponding collimation and redirection elements;

FIG. 40A is a view similar to FIG. 8;

FIG. 40B is a perspective view of a distribution element for use with the transmissive body as shown in FIG. 40A to provide light for illuminating a display;

FIG. 41A is a view similar to FIG. 10;

FIG. 41B is a perspective view of a distribution element for use with the transmissive body as shown in FIG. 41A (or FIG. 40A) to provide light for illuminating a display;

DEFINITIONS

Figure 1:
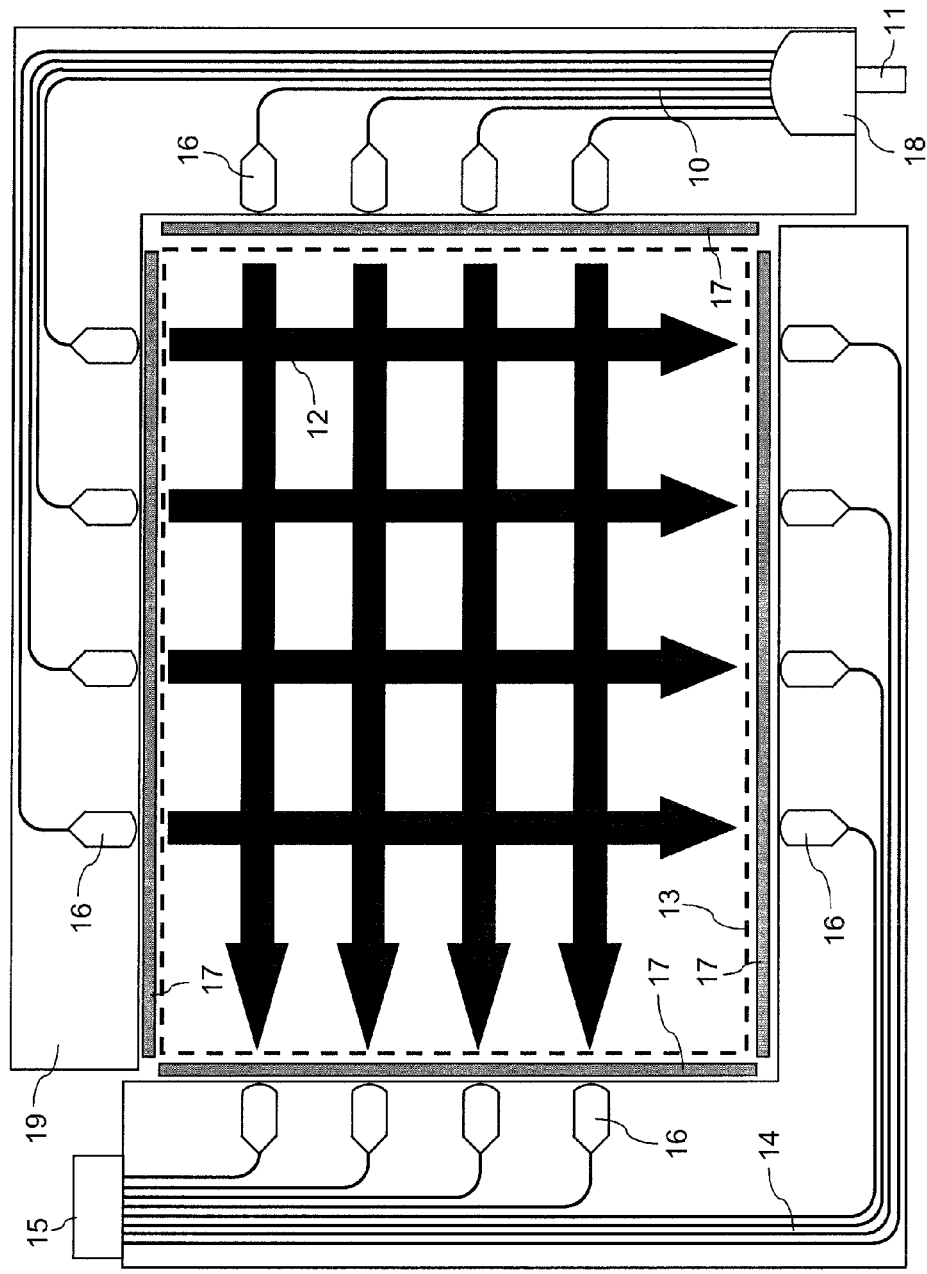
FIG. 1 shows a plan view of a prior art waveguide-based optical touch input device.

In describing and claiming the present disclosure, the following terminology will be used in accordance with the definitions set out below. It is also to be understood that the terminology used herein is for the purpose of describing particular embodiments of the disclosure only and is not intended to be limiting. Unless defined otherwise, all technical and scientific terms used herein have the same meaning as commonly understood by one having ordinary skill in the art to which the disclosure pertains.

The terms plane, sheet and lamina may be used interchangeably herein. These terms have been used when referring to the physical dimensions of an optical signal and are intended to denote the substantial collimation or confinement of a beam of light such that the individual rays of light are travelling together along a well-defined substantially parallel path. Preferably the light signal is collimated such that, in cross section, the plane/sheet/lamina is substantially rectangular. However, it will be appreciated that the present disclosure is not limited to that profile, and other profiles such as rhomboids etc are within the scope of the disclosure.

The term substantially when used throughout the specification, for example in the term substantially collimated signal, is intended to refer to a degree of variation that would be consistent with what a person skilled in the art would understand would arise from natural variation in optical devices as described herein. The use of the word substantially to qualify a number or an expression is merely an express indication that the number/expression is not to be construed as a precise value.

DETAILED DESCRIPTION OF THE DISCLOSURE

References will now be made to the drawings wherein like reference numerals refer to like parts throughout. As mentioned previously, waveguide-based optical touch screen sensors of the type shown in FIG. 1 tend to suffer from a signal to noise problem, where their performance is impaired in bright ambient light conditions. There is also a need to reduce costs, especially in the arrays of transmit waveguides 10 and receive waveguides 14, and to avoid the requirement to align the transmit and receive waveguides carefully during assembly.

Figure 5:
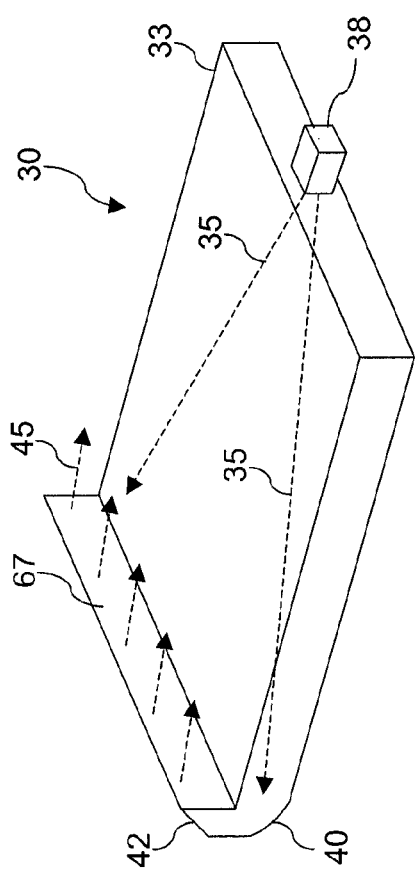
FIG. 5 is a perspective view of the apparatus as shown in FIG. 3.

FIGS. 3, 4 and 5 show plan, side and perspective views respectively of a substantially planar transmissive body 30 for an input device according to a first embodiment of the disclosure. The transmissive body 30 comprises a transmissive element 33 adapted to receive, confine and transmit in planar form an optical signal 35 from an optical source 38. The transmissive body 30 further comprises a collimation element 40 adapted to substantially collimate the optical signal 35, and a redirection element 42 adapted to redirect the optical signal. These elements are arranged to receive an optical signal 35 and convert and transmit it as a substantially collimated signal 45 in a substantially planar form from an exit face 67. It will be appreciated that the divergence angle of the optical signal 35 emitted from the optical source 38 and confined within the transmissive element 33 should be large enough such that the entire width of the collimation element 40 and redirection element 42 is filled (i.e. illuminated). Generally the divergence angle will be sufficiently large for the collimation element and redirection element to be somewhat over-filled, at the expense of some loss of light.

Figure 5A:
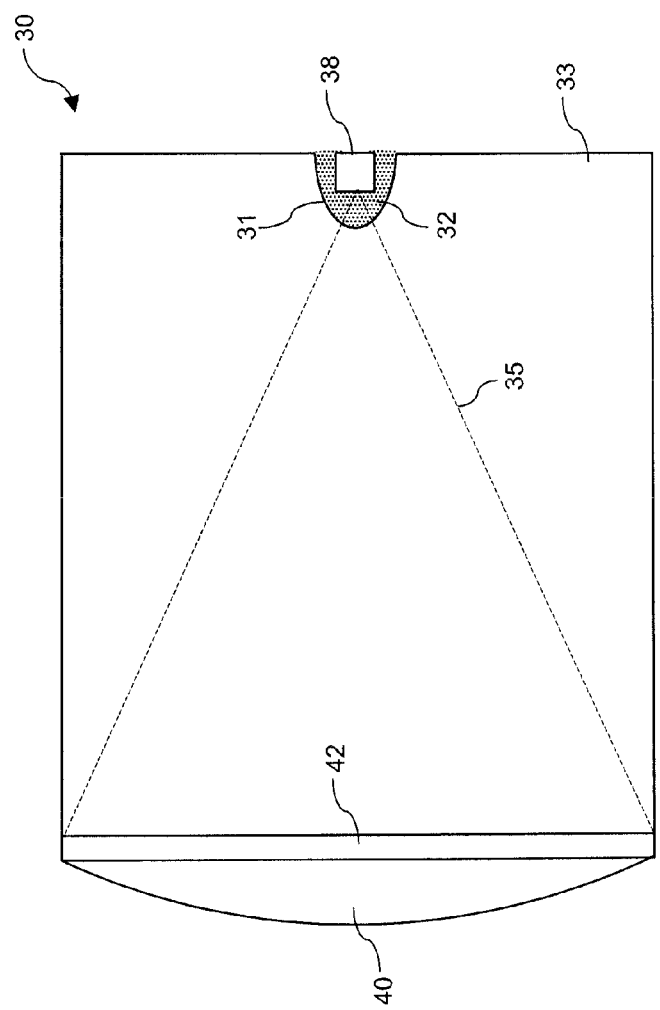
FIG. 5A shows a plan view similar to that of FIG. 3, but with the optical source recessed into the transmissive element.

In an alternative embodiment shown in FIG. 5A, the optical source 38 is located in a recess 31 formed in an edge of a transmissive element 33. If desired, the recess 31 may be specially shaped to provide a lensing action to ensure that the optical signal 35 diverges within the transmissive element 33 so as to fill the collimation element 40 and redirection element 42. Alternatively or additionally, the recess 31 may also contain a transparent adhesive 32 to secure the optical source and to reduce reflection losses. In another alternative embodiment shown in FIG. 5B, the optical source 38 is located in a slot 34 in the transmissive element 33, optionally filled with a transparent adhesive 32.

Figure 6:
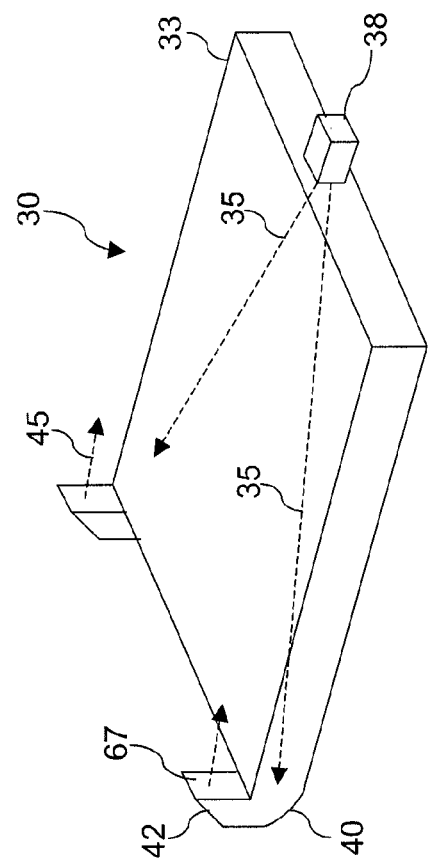
FIG. 6 is a view similar to FIG. 5 but showing only portions of the substantially collimated planar signal being redirected.

The transmissive body 30 may be designed such that the optical signal 35 reflects off each reflective surface (i.e. the collimation element 40 and the redirection element 42) via total internal reflection (TIR). This requires each angle of incidence to be greater than the critical angle c, given by sin $c=n_2/n_1$, where $n_1$ is the refractive index of the material from which the transmissive body is composed and $n_2$ is the refractive index of the surrounding medium. Most polymers have refractive index 1.5, so if the surrounding medium is air (i.e. $n_2$ 1.0), then c will be approximately 42. If the TIR condition cannot be satisfied, then the reflective surfaces can be metallised. In the embodiment as shown in FIG. 5, a substantially collimated planar signal 45 is redirected in a plane substantially parallel to the transmissive element 33 and directed back towards the optical source 38. However, in other embodiments as shown in FIG. 6 only portions of a substantially collimated planar signal 45 are redirected.

Figure 7:
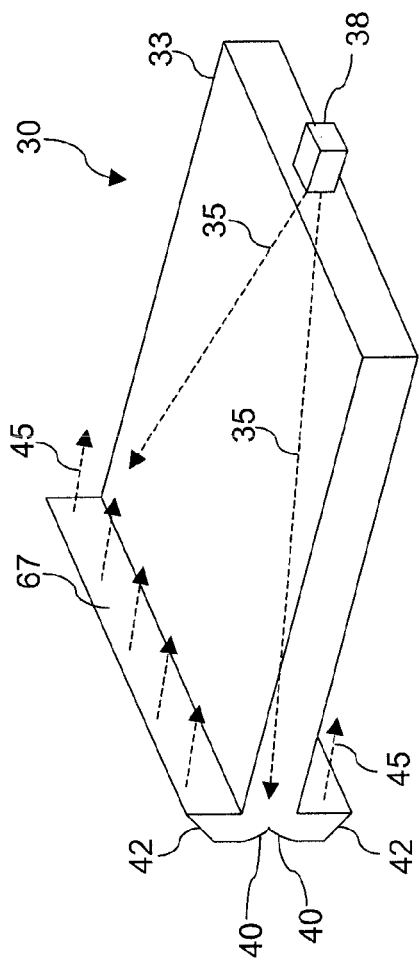
FIG. 7 is a view similar to FIG. 5 but showing the substantially collimated planar signal being redirected into two planes, one beneath and one above the transmissive element.

In a yet further embodiment, as shown in FIG. 7, a substantially collimated planar signal 45 is redirected into two planes, one beneath and one above the transmissive element 33. In a still further embodiment as shown in FIG. 7A, a substantially collimated planar signal 45 is redirected into a planar waveguide 91 integrated with the transmissive element 33. To guide the planar signal, the planar waveguide 91 needs to have a higher refractive index than the transmissive element. With this refractive index relationship, a portion of the optical signal 35 guided within the transmissive element will be coupled into the planar waveguide, but this will be a small effect provided the planar waveguide is much thinner than the transmissive element. This coupling is essentially eliminated in an alternative embodiment shown in FIG. 7B, where the planar waveguide 91 and transmissive element 33 are optically isolated from each other by a cladding layer 92 with refractive index lower than that of both the planar waveguide and the transmissive element. The planar waveguide and cladding layer can be produced on the transmissive element by any of several methods known in the art, including liquid phase deposition methods (e.g. spin coating), vapour phase deposition methods (e.g. chemical vapour deposition) and ion diffusion.

The optical source 38 may be a point-like source emitting a diverging optical signal, for example an LED. When the optical source 38 provides a diverging optical signal the collimation element 40 may be chosen to be a substantially parabolic reflector, shaped and positioned such that its focus is substantially coincident with the optical source. This configuration enables the transmissive body 30 of the disclosure to provide collimation of a diverging optical signal 35 into substantially parallel rays of light, i.e. collimation into the optical signal 45. In an alternative arrangement, shown in FIG. 6A, the collimation element 40 is an elliptical lens 61 located after the redirection element 42, and with its further focus substantially coincident with the optical source 38. To explain further with reference to FIG. 6B, an ellipse is defined as the locus of points on a plane where the sum of the distances from any point on the curve to two fixed points is constant, the two fixed points being referred to as the foci 62 and 63. Light emanating from a point source 38 located within a planar higher refractive index medium 64 will emerge into a lower refractive index medium 66 as a beam 68 collimated in the plane of the higher refractive index medium provided that the higher refractive index medium is bounded by a surface 61 that is a portion of an ellipse with eccentricity equal to the ratio of the refractive indices of the two media, and provided the point source is located at the further focus 62. It will be appreciated by the skilled addressee that the term further focus is simply referring to the focus further away from the lens surface 61. Referring back to FIG. 6A, it will be appreciated that the geometry shown in FIG. 6B applies despite the fact that the optical path between the source 38 and the elliptical lens surface 61 is folded by the redirection element 42.

Those skilled in the art will appreciate that the concept of a point source is an idealisation, since the light-emitting surface of any real optical source will have non-zero dimensions. For the purposes of this specification, an optical source 38 will be considered to be a point-like source if its light-emitting surface is small compared to at least one dimension of the transmissive body 30.

It will be appreciated that the collimation element 40 should be angled so as to direct the light towards the redirection element 42. It will be appreciated that the order of the collimation element 40 and the redirection element 42 could be reversed. Alternatively, the collimation element and redirection element may be combined into a single collimation/redirection element that performs both the collimation and redirection functions.

Figure 7C:
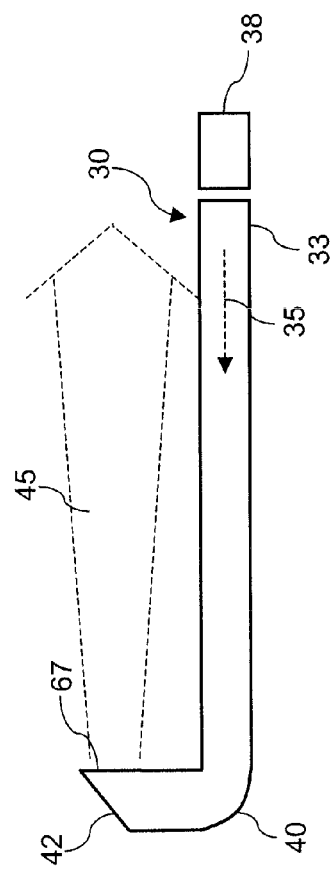
FIG. 7C is a view similar to FIG. 4 but showing a slight out-of-plane divergence of the substantially collimated planar signal.
Figure 7D:
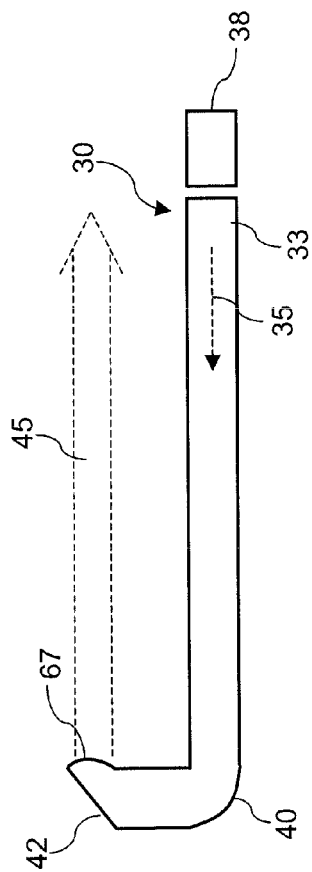
FIG. 7D is a view similar to FIG. 7C but showing how a cylindrical lens facet can be incorporated into a transmissive body to limit out-of-plane divergence of the substantially collimated planar signal.
Figure 7E:
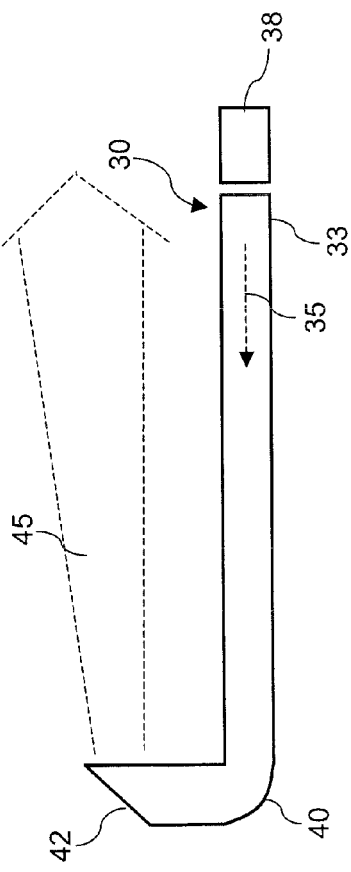
FIG. 7E is a view similar to FIG. 7C but showing a redirection element with a different inclination.

A substantially collimated planar signal 45 should also be collimated in the vertical direction, as shown in FIG. 4. In reality however the signal 45 will often have some divergence in the vertical direction, as shown in FIG. 7C, although the divergence angle will be relatively small, of order ten degrees, because the exit aperture defined by the redirection element 42 will generally be quite large (in optical terms), of order 1 mm. For the purposes of this specification, a signal 45 with slight divergence in the vertical direction will still be considered to be a planar signal, i.e. a lamina or sheet of light. Despite the fact that any vertical divergence will be slight, it is possible that a portion of a diverging signal 45 could reflect off the top surface of the transmissive element 33 and leak around a touch object, potentially causing problems with touch detection (as will be clear from inspection of FIG. 13 for example). This vertical divergence may be reduced for example by imposing an appropriate cylindrical curvature on the exit face 67 (as shown in FIG. 7D) or on the redirection element 42. Alternatively, as shown in FIG. 7E the inclination of the redirection element 42 may be altered such that a diverging signal 45 does not reflect off the top surface of the transmissive element 33.

Although the transmissive element 33 has been depicted as a rectangular sheet, those regions located outside the divergence angle of an optical signal 35 may be omitted, if desired.

Referring now to FIGS. 8 and 9, a pair of optical sources 38 may be provided and oriented perpendicularly to each other on adjacent sides of a transmissive element 33. Pairs of collimation 40 and redirection elements 42 may also be provided on mutually opposing sides of the transmissive element 33 to each of the optical sources 38, thereby providing a pair of substantially collimated planar signals 45 that propagate in substantially perpendicular directions. In the embodiment shown in FIG. 9 the substantially collimated planar signals 45 are in mutually spaced apart parallel planes. In yet a further construction as shown in FIGS. 10 and 11, a single optical source 38 is provided near a corner of a transmissive element 33, and pairs of collimation 40 and redirection elements 42 are provided and positioned on the transmissive element 33 for providing a pair of substantially collimated planar signals 45 that propagate in substantially perpendicular directions. In the embodiment shown in FIG. 11, the collimated planar signals 45 are coplanar.

In some circumstances it may be desirable for two substantially collimated planar signals 45 to lie in different planes, for example if some Z axis sensitivity (such as the approach velocity or angle of a touching object) is desired, or to guard against a false touch from a small object such as an insect. It will also be appreciated that the embodiment shown in FIG. 8 could also be achieved by simply overlaying a pair of single axis transmissive bodies (as shown in FIG. 3) with a 90 rotation.

Figure 2:
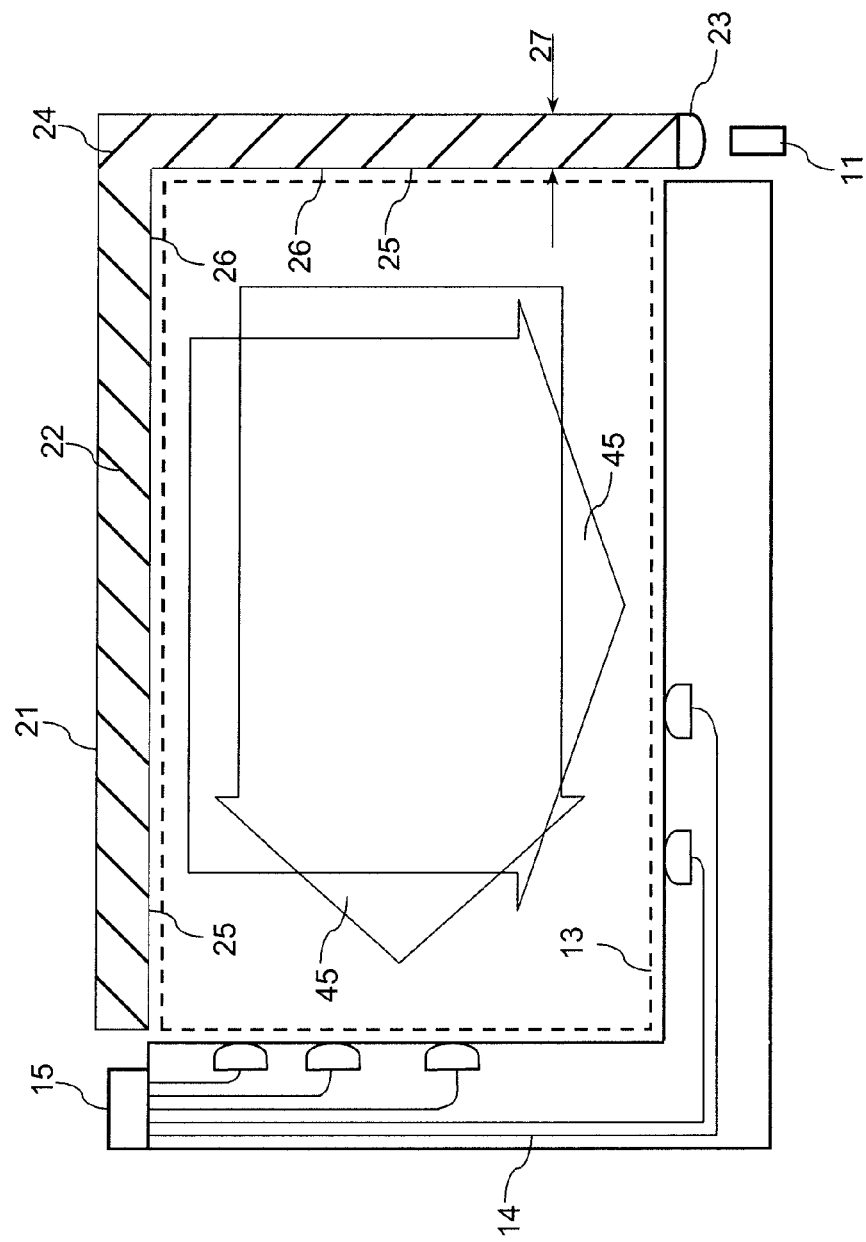
FIG. 2 shows a plan view of a prior art optical touch input device including a light pipe on the transmit side.
Figure 2A:
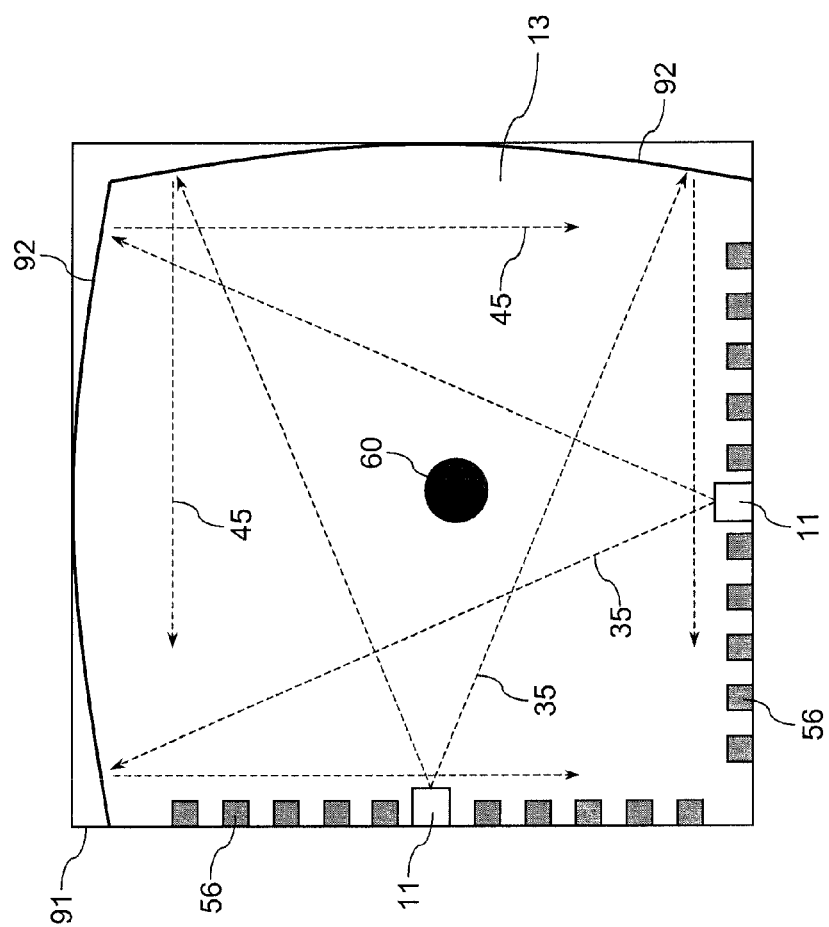
FIG. 2A shows a plan view of a prior art optical touch input device including parabolic reflectors.

Referring now to FIGS. 12 and 13, the present disclosure also provides a touch input device where the substantially collimated planar signal(s) 45 define an input area 50 and are directed to at least one light detecting means 55 for detecting an input 60, the input being determined by interruption of the collimated planar signal(s) 45. The light detecting means 55 are adapted to receive at least a portion of the substantially collimated planar signal(s) 45 for detecting an input. A touch input device of this form may find application as, for example, a digitiser tablet. In the embodiment shown in FIGS. 12 and 13 there are first and second light detecting means 55, at least one of which includes at least one individual photo-detector 56 positioned adjacent to each of the two receive sides of the input area. The first and second light detecting means may each include an array of photo-detectors 56 positioned adjacent to a receive side. If light leakage from the optical sources 38 to the photo-detectors 56 is perceived to be a problem, it may be reduced by addition of an opaque sheet 57. It will be seen that the touch input device shown in FIGS. 12 and 13 offers a crucial advantage over the prior art device of FIG. 2A, in that because the outgoing light 35 is guided within the transmissive element 33, it cannot be blocked by a touch object 60. Although an object contacting the transmissive element may in some circumstances interfere with the guidance of the outgoing light 35, this is in practice a miniscule effect. Because the transmissive element needs to have sufficient thickness for mechanical strength (of order 0.5 mm or more), it operates as a bulk optics light pipe with only a tiny fraction of the outgoing light likely to be out-coupled. The situation is quite different if the transmissive body includes a planar waveguide 91 as shown in FIG. 7A. Those skilled in the art of evanescent optical waveguide sensors will appreciate that provided the planar waveguide is sufficiently thin to be single mode or few-moded, of order 10 m, a significant amount of the collimated signal 45 within the planar waveguide will be outcoupled by a touch object.

Figure 14:
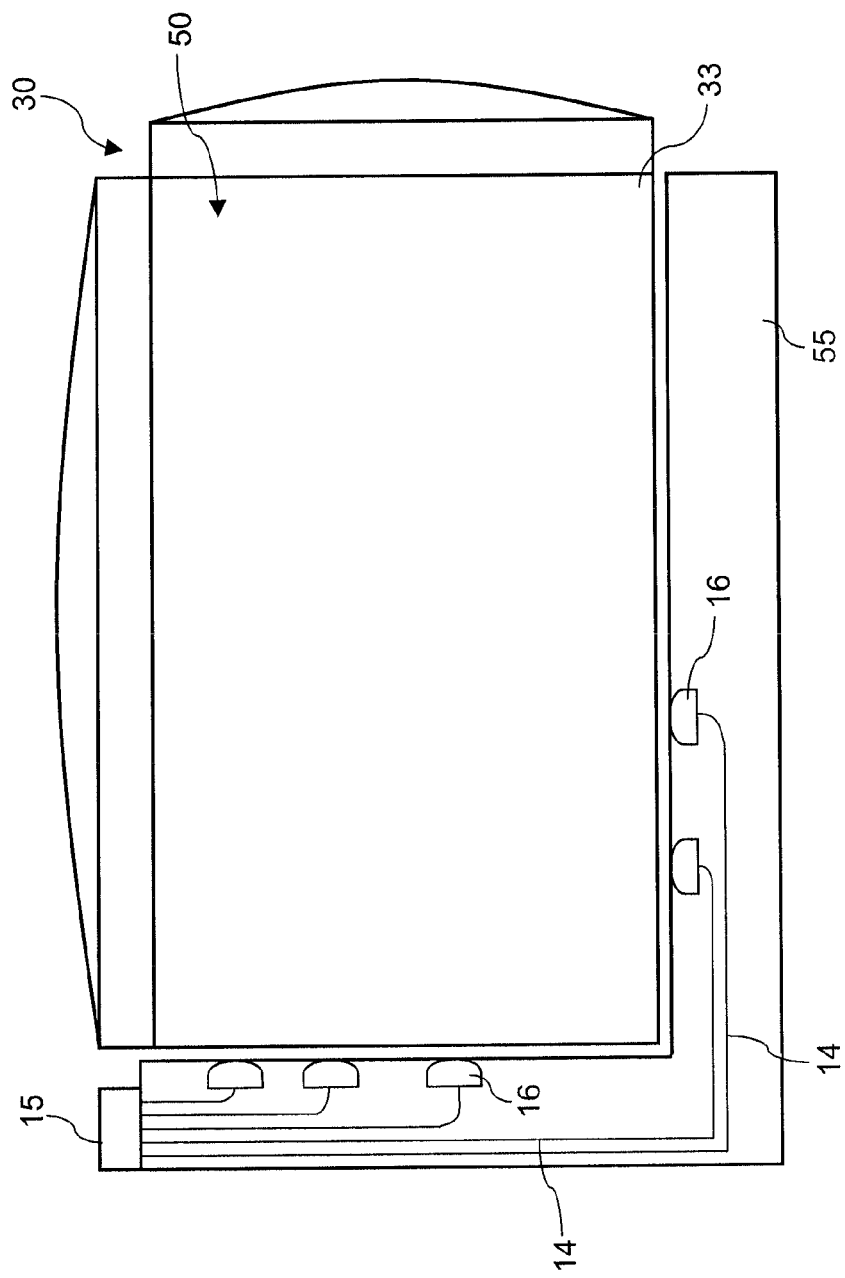
FIG. 14 is an alternative embodiment of the embodiment as shown in FIG. 12.
Figure 15:
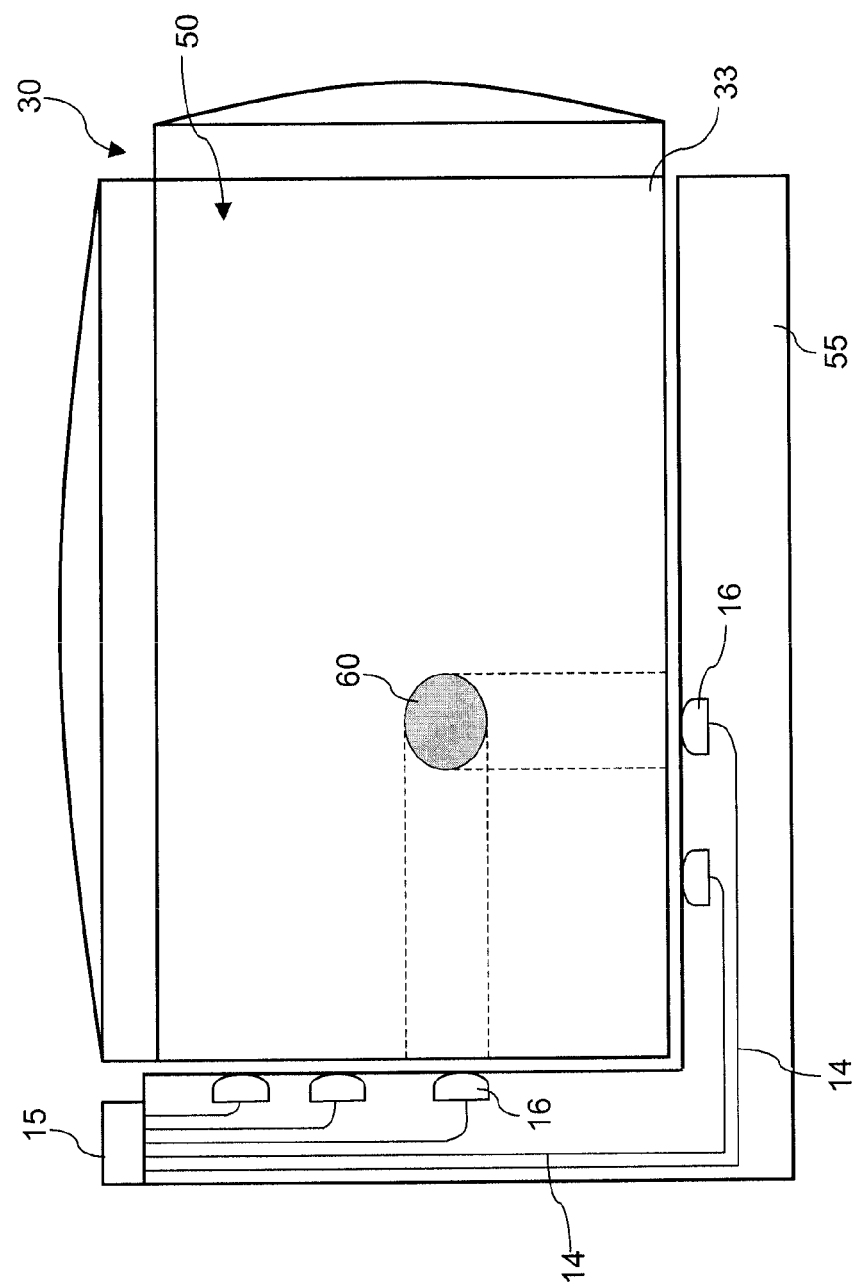
FIG. 15 is a view similar to FIG. 14 but showing an interruption of the substantially collimated planar signals by a touch event.

FIGS. 14 and 15 provide an alternative embodiment to that shown in FIGS. 12 and 13. In this embodiment at least one of the first and second light detecting means 55 comprises at least one optical waveguide 14 in optical communication with a multielement detector 15 remote from the receive sides. The first and second light detecting means may each comprise an array of optical waveguides 14 in optical communication with a common multi-element detector 15. Alternatively, each of the first and second light detecting means may have its own multi-element detector. As known in the art, each waveguide 14 may also have an associated in-plane focussing lens 16 to focus light in the horizontal plane. Alternatively, as disclosed in U.S. Pat. No. 7,352,940, incorporated herein by reference, each waveguide may have an associated in-plane focussing mirror to focus light in the horizontal plane. Additionally, with reference to FIG. 1, there may be an external vertical collimating lens 17 along each receive side to focus light in the vertical plane. The waveguides 14 may be integrated optical waveguides, although optical fibres may also be used.

Irrespective of the form of the light detecting means 55, an input 60 in the form of a touch within an input area 50 will block a portion of each the two sheets of light 45, allowing its location to be determined from the position of the shadows. It will be appreciated that if the two sheets of light 45 are located a significant distance from the upper surface of the transmissive element 33, the display device will be sensitive to a near touch as well as to a direct touch on the upper surface. Such near touch sensitivity may be used to advantage for example to provide an additional hover mode function to a touch panel that operates by some other mechanism, such as a resistive touch panel.

A display 65 such as an LCD may be positioned either on the opposite side of a transmissive element 33 to a substantially collimated planar signal 45, as best shown in FIG. 16, or between a substantially collimated planar signal 45 and a transmissive element 33, as best shown in FIG. 17. In the former example the transmissive element 33 needs to be transparent to visible light and forms the touch surface.

In certain embodiments a transmissive body 30 is formed from a unitary piece of plastics material substantially transparent to the signal light. The signal light maybe be in the infrared region of the spectrum so that the transmissive body may optionally be opaque to ambient visible light. A unitary transmissive body 30 with realistic scaling is shown in FIGS. 18A (plan view), 18B (side view) and 18C (perspective view). This unitary transmissive body includes a transmissive element 33 with planar dimensions 65 mm×82 mm and thickness 0.7 mm, and having an entry face 70 for accepting light from a point-like source and a collimation/redirection portion 71 with two internally reflective facets 72, 73 and an exit face 67 through which a substantially collimated planar signal is emitted. The exit face 67 extends 0.7 mm above the transmissive element 33. The internally reflective facets 72, 73 in combination have substantially parabolic curvature and serve to collimate and redirect light guided by the transmissive element 33. That is, the internally reflective facets in combination act as a collimation element and a redirection element. This unitary transmissive body is relatively simple to produce from a plastics material by injection moulding. From comparison with FIGS. 3, 4 and 5 it will be appreciated that the specific transmissive body shown in FIGS. 18A, 18B and 18C will only produce a collimated signal 45 propagating in a single direction. However this is for simplicity of illustration only and it is straightforward to produce a bi-directional version with two collimation/redirection portions 71 on adjacent sides of the transmissive element 33.

In other embodiments a transmissive body is formed as a pair of bodies, with a transmissive element and a collimation/redirection element manufactured separately. As shown in FIGS. 19A (plan view), 19B (side view) and 19C (perspective view), a collimation/redirection element 74 produced from a plastics material by injection moulding includes an entry face 75 for receiving light from a separate transmissive element, a pedestal 76 for mounting the transmissive element, and two internally reflective facets 72, 73 and an exit face 67 that function as described with respect to FIGS. 18A, 18B and 18C. In one specific design, the entry face 75 and exit face 67 are each 65 mm×0.7 mm and the pedestal 76 extends 3 mm from the entry face. In the embodiment shown in FIG. 19B the surfaces 73A and 73B are both parallel to the surface 73C, while in an alternative embodiment they are both angled slightly, of order 1, with respect to the surface 73C, so as to be further from that surface at the end constituted by the reflective facets 72, 73. This is to assist in releasing the element 74 from a mould, and does not significantly affect the collimation/redirection performance of the element.

In one embodiment, the transmissive body as shown in FIGS. 19A (plan view), 19B (side view) and 19C (perspective view) comprises an entry face for receiving a divergent optical signal from an optical source; a collimation and redirection element adapted to substantially collimate and redirect the optical signal; and an exit face for transmitting the optical signal as a substantially collimated signal in a substantially planar form. In another embodiment the transmissive body comprises: an entry face for receiving divergent light from an optical source; a collimation element adapted to substantially collimate the optical signal; a redirection element adapted to redirect the optical signal; and an exit face for transmitting the optical signal as a substantially collimated signal in a substantially planar form. The transmissive body may further comprise a coupling means for optically coupling a substantially planar transmissive element to the entry face, wherein the divergent light is diverging in the plane of the transmissive element. The coupling means may include a pedestal. The substantially collimated planar signal may be redirected in a plane parallel to the plane of the transmissive element.

In another aspect, the present disclosure provides an assembly for an input device comprising: a transmissive element 33 adapted to receive an optical signal 35 from an optical source 38 and confine and transmit the optical signal 35 in substantially planar form into a transmissive body comprising a collimation element adapted to substantially collimate an optical signal; and a redirection element adapted to substantially redirect an optical signal, wherein the elements are arranged to receive a substantially planar optical signal and collimate and redirect the optical signal to produce a substantially collimated planar signal. The transmissive element may be an outer glass or plastic plate of a touch screen or display.

As shown in FIG. 20, a transmissive body 30 is produced by joining a collimation/redirection element 74 to a transmissive element 33 using double-sided pressure-sensitive tape 77 such as a VHP transfer tape from 3M. If desired, the interface between the transmissive element and the entry face 75 can be filled with an optical adhesive. In this embodiment the transmissive element 33 consists of a simple rectangular sheet of glass that is more scratch resistant and provides more robust protection for an underlying display that if it were composed of a polymer material. However as described below there are situations where the transmissive element is preferably formed of a polymer. It will be appreciated that a bi-directional transmissive body can be produced by joining two collimation/redirection elements 74 to adjacent sides of a transmissive element 33. Alternatively, a single L-shaped collimation/redirection element could be moulded and joined to a transmissive element.

In situations where a touch input device includes a display with a transparent cover such as a protective glass sheet, this cover can serve as the transmissive element. In the embodiment shown in FIG. 21, a collimation/redirection element 74 is attached with double-sided tape 77 to a protective glass cover 78 of a liquid crystal display 65, such that light 35 launched into the glass cover from a point-like source 38 is collimated and redirected by the element 74 to produce a substantially collimated planar signal 45.

We turn now to consideration of bezel width when a transmissive body of the present disclosure is used in an input device. In the situation shown in FIG. 13 where an input device includes a unitary transmissive body 30 of the type shown in FIGS. 18A, 18B and 18C, the input area 50 essentially overlies the rectangular transmissive element 33, with the remainder of the transmissive body 30 (i.e. the collimation/redirection element 71) located outside the input area. As such, this element 71 will be located in the bezel around a display, and may be the limiting factor in determining how narrow the bezel can be made, an important consideration for some touch screen applications such as mobile phones. The width of an element 71 will be determined by the shape of the parabola defining the internally reflective facets 72 and 73, which in turn will be determined by the size of the input area because of the necessity for the optical source 38 to be located at the focus of the parabola. Mathematically it turns out that the element 71 needs to be wider for smaller input areas, where the focal length of the parabola is smaller, which is a potential problem because bezel width is more likely to be a concern with smaller input devices. In a specific example, for a 3.5" (8.9 cm) touch screen the element 71 will be approximately 7 mm wide.

One possible solution, shown in FIG. 22, is to use a segmented reflector, also known as a Fresnel reflector, with multiple offset parabolic reflectors 80 instead of a single parabolic reflector 81, resulting in a significant reduction 82 in the bezel width. It should be noted that each reflector 80 is a portion of a different parabola because the focal lengths are different. Potential drawbacks with this approach are that a transmissive body with a Fresnel reflector may be more difficult to manufacture by injection moulding, and stray reflections off the corners 83 may interfere with touch detection. Another solution, shown in FIG. 23, is to design a transmissive body 30 with multiple parabolic reflectors 84, each with an optical source 38. The reduction in bezel width must be weighed against the additional cost of optical sources and the somewhat more complicated shape of the transmissive body. However for a 3.5" (8.9 15 cm) touch screen, a design with as few as two parabolic reflectors 84 and optical sources 38 reduces the bezel width from 7 mm to a much-improved 2 mm.

Figure 24:
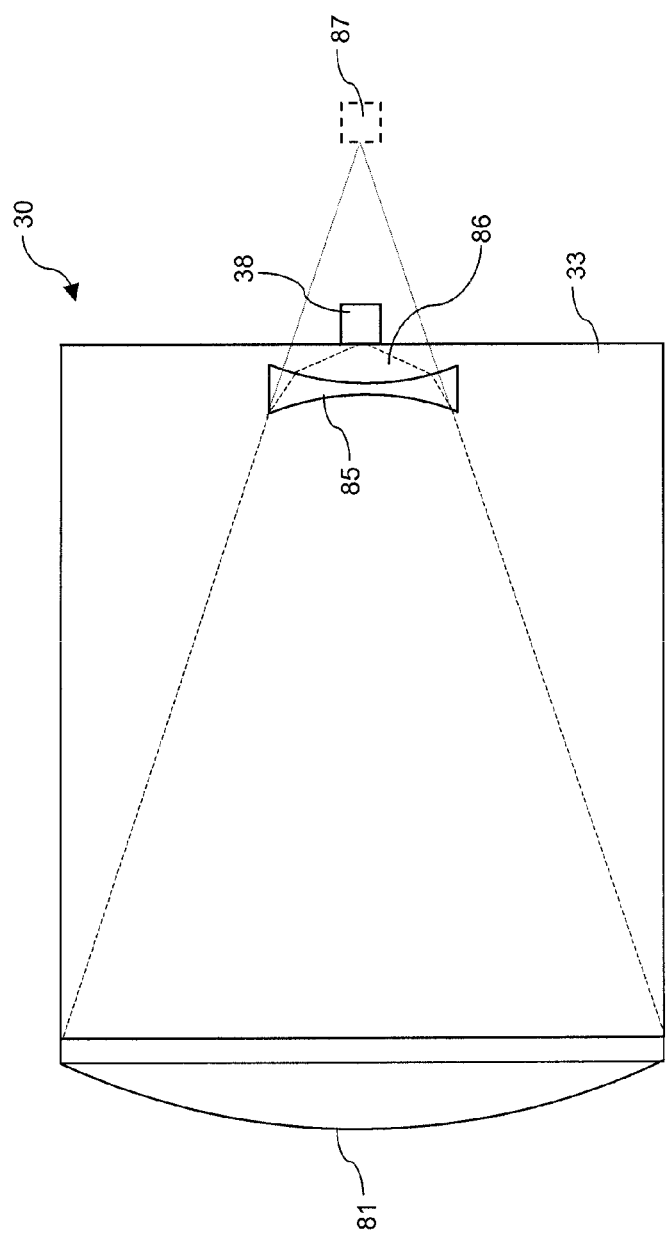
FIG. 24 is a plan view of a transmissive body incorporating a converging lens.

Yet another solution, shown in FIG. 24, is to design a transmissive body 30 incorporating one or more lenses to enable a single parabolic reflector 81 to be designed with a larger focal length, and hence with less pronounced curvature. By way of example, FIG. 24 shows a transmissive body 30 formed from an injection moulded plastics material, with a converging lens 85 composed of air (i.e. a lower refractive index medium) in the optical path between the optical source 38 and the parabolic reflector 81. In this example, the optical source 38 emits a highly divergent beam 86 that is partially converged by the lens 85, forming a virtual image 87 of the optical source that is further from the parabolic reflector 81 than the optical source itself, effectively simulating a larger overall device. The skilled person will realise that combinations of two or more lenses, such as a diverging lens followed by a converging lens in a beam expander configuration, could also be used for this purpose.

Still another solution is to design a transmissive body that increases the distance between the optical source and the parabolic reflector by enabling a double pass propagation path of the signal within the transmissive element. One possible configuration, shown in FIG. 25 (plan view) and FIG. 26 (side view), is to mould a transmissive body 30 with a tapered portion 88 that allows signal light 35 from an optical source 38 to enter the transmissive element 33 and reflect off a metallised surface 89 before encountering the parabolic reflector 81. Another possible configuration, shown in FIG. 27 (side view) is to launch signal light 35 through one surface 90 of the parabolic reflector 81. It will be appreciated that this particular solution is only possible if the surface 90 does not need to be metallised (i.e. if the parabolic reflector 81 operates by total internal reflection). It will also be appreciated that a double pass configuration where the optical source is simply placed in a slot proximate to the parabolic reflector and facing the metallised surface 89 is less desirable, because the optical source would lie in the optical path, causing a shadowing effect.

Figure 6A:
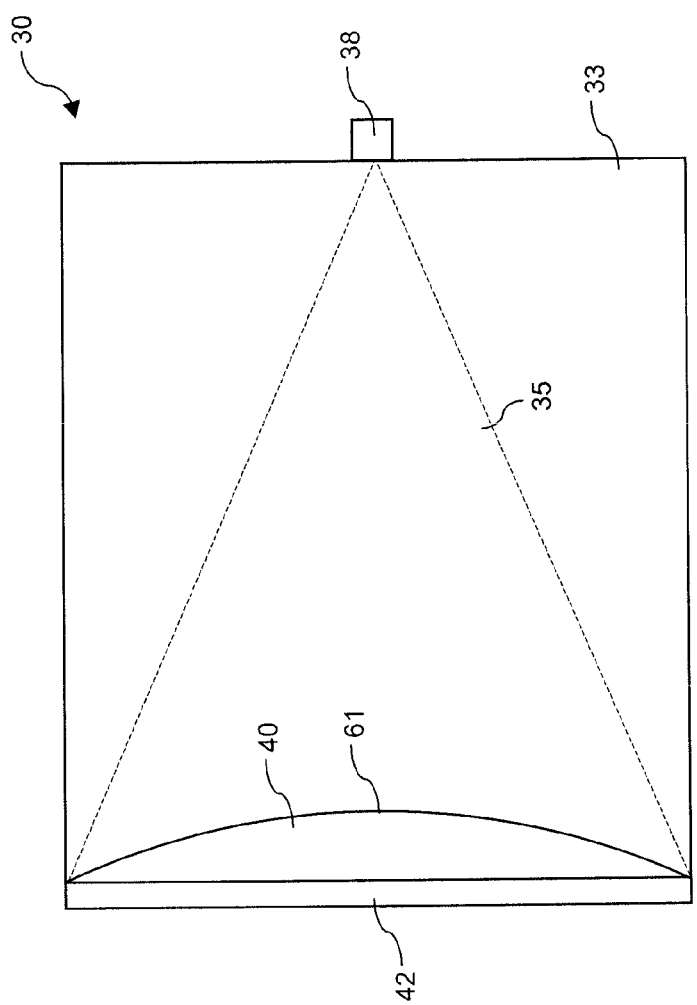
FIG. 6A shows a plan view of a transmissive body including an elliptical lens as the collimation element.
Figure 6B:
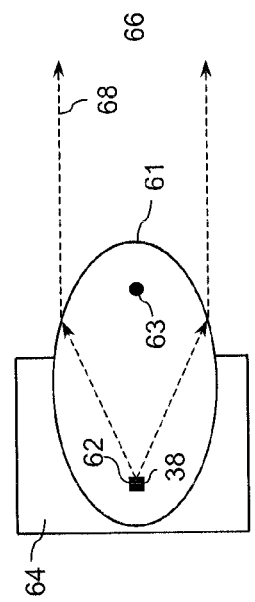
FIG. 6B illustrates the geometry of refraction at an elliptical lens surface.

It will be appreciated that many of these approaches for reducing the bezel width will be equally applicable for composite transmissive bodies assembled as shown in FIGS. 20 and 21, and for transmissive bodies where the collimation is performed by elliptical lenses (e.g. as shown in FIG. 6A) instead of parabolic reflectors. Inspection of FIG. 6A shows that although the elliptical lens surface 61 curves inwards instead of outwards, a bezel will still need to be sufficiently wide so that the lens does not interfere with the touch input area.

Figure 28A:
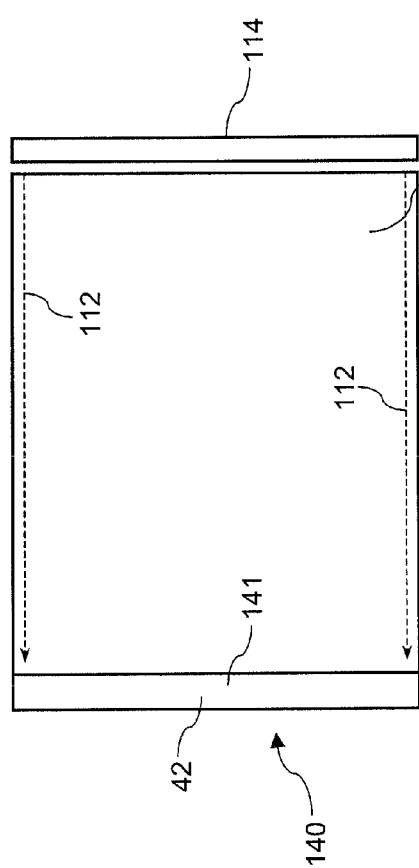
FIG. 28A shows a plan view of a transmissive body according to an embodiment of the disclosure, shown optically coupled to an extended light source and a substantially planar signal being produced.
Figure 28B:
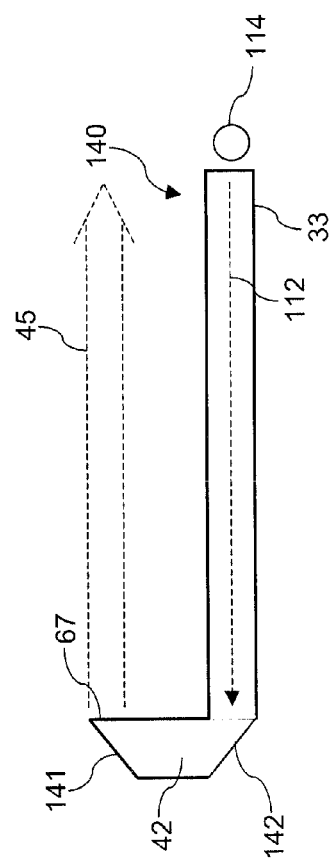
FIG. 28B is a side view of the apparatus shown in FIG. 28A.

We turn now to consideration of bezel height. Referring back to FIGS. 18A, 18B and 18C, it is apparent that the height of the exit face 67 (for example 0.7 mm) translates directly to bezel height. In some device applications this will be acceptable, whereas for other devices it will be desirable to have the bezel essentially flush with the touch surface. For this zero bezel height requirement the configurations shown in FIGS. 7A and 7B, where a substantially collimated planar signal 45 is guided within a planar waveguide 91, may be desirable. As explained previously, a touch object will out-couple a significant amount of the signal from the planar waveguide, an effect that can be used to sense a touch object. In this type of touch input device, based on an effect known as frustrated total internal reflection (FTIR), a touch object reduces the amount of signal propagating within the planar waveguide 91, a reduction that can be detected by a light detecting means 55 as shown in FIGS. 12 and 13 for example. Touch input devices that rely on FTIR are disclosed for example in U.S. Pat. No. 6,972,753, US 2008/0006766 and US 2008/0088593. A potential problem with touch input devices based on FTIR is that dirt or oil (e.g. from a finger) on the surface of the planar waveguide may also out-couple signal light, interfering with touch detection. As shown in FIG. 28 (side view), one means for mitigating this is to introduce an adaptation well known from resistive touch input devices. Specifically, a flexible sheet 93 separated from the planar waveguide by spacers 94 is introduced such that the planar signal 45 is only out-coupled when a touch object pushes the flexible sheet onto the planar waveguide. Irrespective of whether this flexible sheet is present, an advantage of locating the planar signal 45 within the planar waveguide 91 instead of in free space is that the principles of the present disclosure can be applied to flexible displays, as well as to curved displays (e.g. CRTs) with avoidance of parallax error.

The foregoing discussion has described optical elements capable of converting light from a point-like source into a sheet/lamina of light in a substantially planar form. In an alternative embodiment, illustrated in FIGS. 28A to 28D, an extended light source 114 in the form of a CCFL can be used instead of the point-like source 38 as the source of signal light. In this embodiment the transmissive body 140 includes a transmissive element 33 and a redirection element 42 including two reflective facets 141 and 142. A collimation element is not required to produce the substantially collimated planar signal 45, since the light 112 launched into the transmissive element by the extended light source does not diverge in the plane of the transmissive element. In an alternative embodiment shown in FIG. 28D, an array of point-like sources 38 is used to simulate an extended light source. In analogous fashion, a redirection element with a pedestal and two reflective facets could be used in place of the collimation/redirection element 74 shown in FIGS. 19A, 19B and 19C, if the source of signal light were an extended source rather than a point-like source. An advantage with using an extended light source is reduced bezel width, because the curvature of the collimation element is removed.

The components of the aforementioned transmissive bodies, whether with or without a collimation element, are of a sufficiently simple design to be readily massproduced from injection-moulded polymer materials or from readily available materials such as plate glass. The use of such components in the construction of touch input devices has also been described. Compared to the all-waveguide devices of the prior art as shown in FIG. 1, these touch input devices are relatively cheaper to manufacture and assemble and are much less susceptible to interference from ambient light. The combined benefits of (i) improved coupling of a light source into a transmissive element 33 instead of a planar waveguide optical splitter 18, and (ii) a larger amount of power in the collimated planar signal 45 for coupling into the receive waveguides 14, yields an improvement of two orders of magnitude in signal-to-noise at the multi-element detector 15. Consequently these touch input devices are able to operate in much greater levels of ambient light, even full sunlight. Alternatively or additionally, they can be operated with much lower optical signal powers, saving battery life when used in mobile electronic devices.

Whilst the transmissive bodies 30 and 140 according to the present disclosure have been described thus far with respect to optical touch input devices, the skilled person will appreciate that there are a number of other uses for them. In one example, they can clearly be used in reverse; for instance a transmissive body 30 as shown in FIG. 5 could receive a substantially planar collimated signal 45 at the exit face 67 and redirect, focus and transmit the signal to a photo-detector located at the position of the optical source 38.

Figure 29:
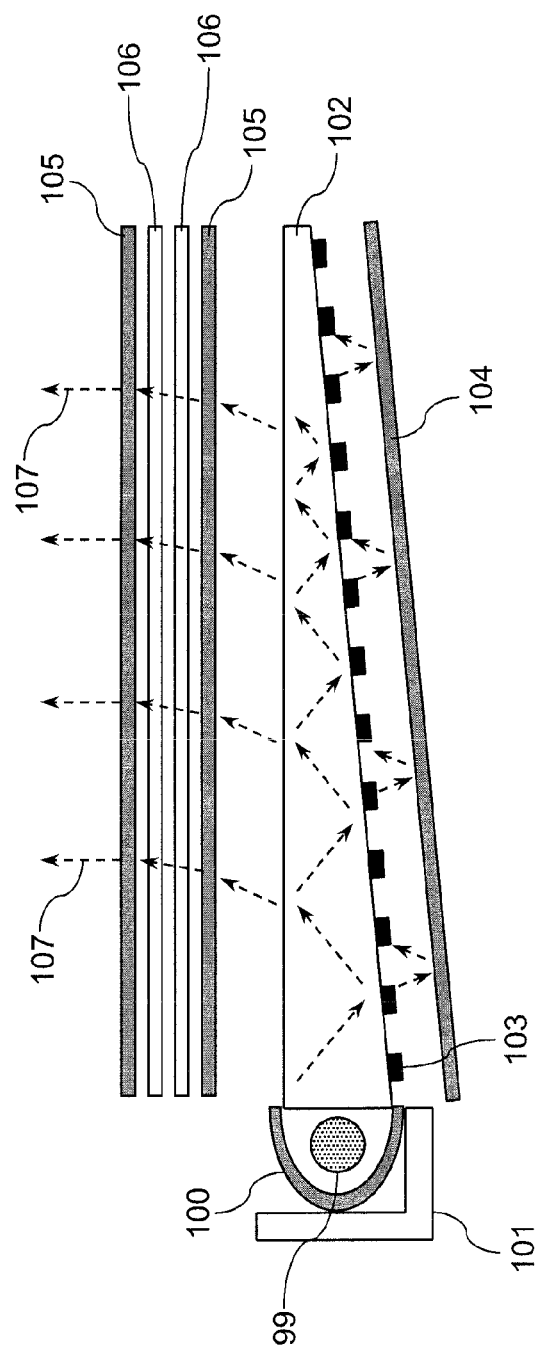
FIG. 29 is a sectional view of a typical prior art backlighting unit, employing a cold cathode fluorescent lamp (CCFL) to supply light to a distribution element.

Another example is in the field of display illumination, for example backlighting a transmissive display or frontlighting a reflective display. To explain the backlighting application, the backlighting unit of an LCD traditionally uses a light source unit arranged in a side portion of the display. A backlighting unit of this sort is called a side lamp type backlighting unit, a typical example of which is shown in FIG. 29. This 15 backlighting unit employs a Cold Cathode Fluorescent Lamp (CCFL) 99 housed in a parabolic lamp reflector 100. The lamp and reflector are held in place with a lamp cover 101. The CCFL 99 directs light into a typically wedge-shaped distribution element 102 that can take a variety of forms, as disclosed for example in U.S. Pat. Nos. 5,237,641, 5,303,322, 5,914,760, 6,576,887 and 6,590,625. Typically, the distribution element is patterned on one side with elements 103 that may be in the form of prisms, for extracting light. Other common components of a side lamp type backlighting unit include a reflector plate 104, one or more diffuser plates 105, and one or more brightness enhancement films 106 (typically composed of arrays of prisms). The components of the backlighting unit combine to direct light 107 through an LCD display (not shown).

It will be appreciated that side lamp type frontlighting units (disclosed for example in U.S. Pat. Nos. 6,295,104 and 6,379,017) bear many similarities to the side lamp style backlighting unit shown in FIG. 29, except that the distribution element directs light down onto a reflective display rather than up through a transmissive display.

Figure 30B:
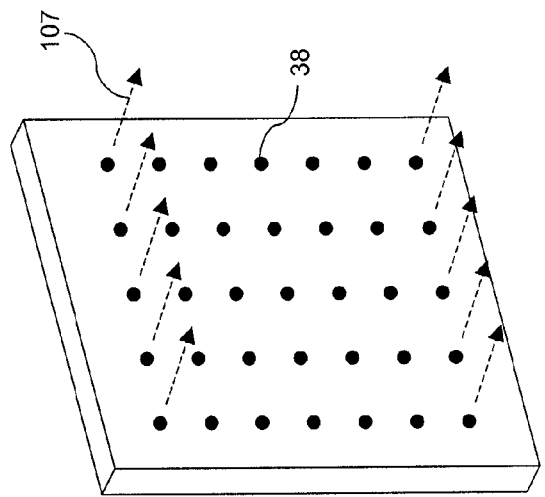
FIGS. 30A and 30B are typical prior art LED backlighting systems, i.e. edge-lit and back-lit respectively.
Figure 30A:
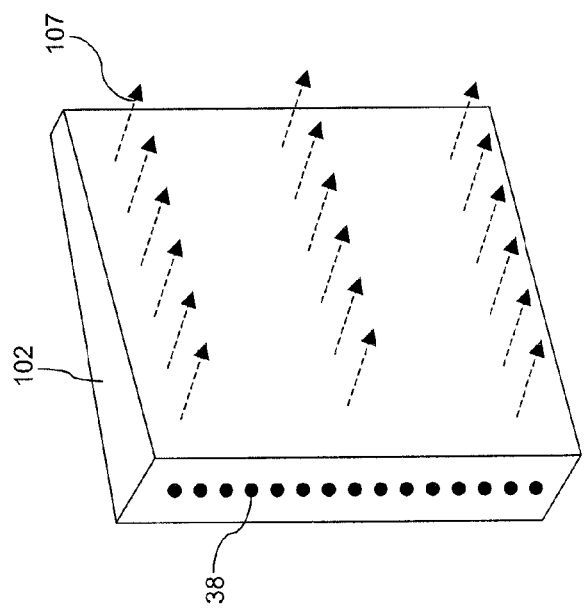

In many applications, LEDs are being designed into lighting systems to replace existing light sources due to their lower costs, higher power efficiencies, better light gamut control and other features. However, one of the challenges in achieving this goal is that LEDs are essentially point sources of light rather than extended sources (such as CCFLs) that are required for many apparatus for display illumination. Current LED backlighting may be conveniently divided into two main categories, namely, edge-lit and back-lit:
a.) Edge-lit: LEDs 38 replace the CCFL in an edge arrangement similar to that shown in FIG. 29, as can be seen in FIG. 30A. LED edge lighting is typically employed on sub-34 displays.
b.) Back-lit: arrays of spaced LEDs 38 are positioned behind a diffuser plate (not shown) to directly illuminate the LCD display, see FIG. 30B. Back-lit LED arrays are typically used on large LCD displays, such as televisions.

It will be appreciated that light distributed into the display must be of the correct colour to maximise viewer perceived performance, and since LED backlights allow greater control of the colour gamut they are increasingly becoming the preferred light source for backlighting units. It will be further appreciated that the role of the backlighting unit is to take light from the light-source(s) and distribute it into an LCD with maximum efficiency. Maximum efficiency includes low optical losses in the backlighting unit itself, high uniformity of emitted light from the backlighting unit, and emitted light with characteristics most suited to acceptance by the LCD (typically light closer to being emitted perpendicular to the plane is most efficient). Inefficiencies in light use mean lower available brightness of the LCD, greater thermal issues, and higher power consumption for a required brightness. Further, it will be appreciated that the backlighting unit contributes considerably to the cost of an LCD, and may comprise fluorescent or LED light sources, the light guiding plates, any special films (such as Vikuti brightness enhancement films) and associated assembly and integration with the LCD stack. Further still, the backlighting unit adds considerably to both weight and thickness of a complete LCD.

Figure 31:
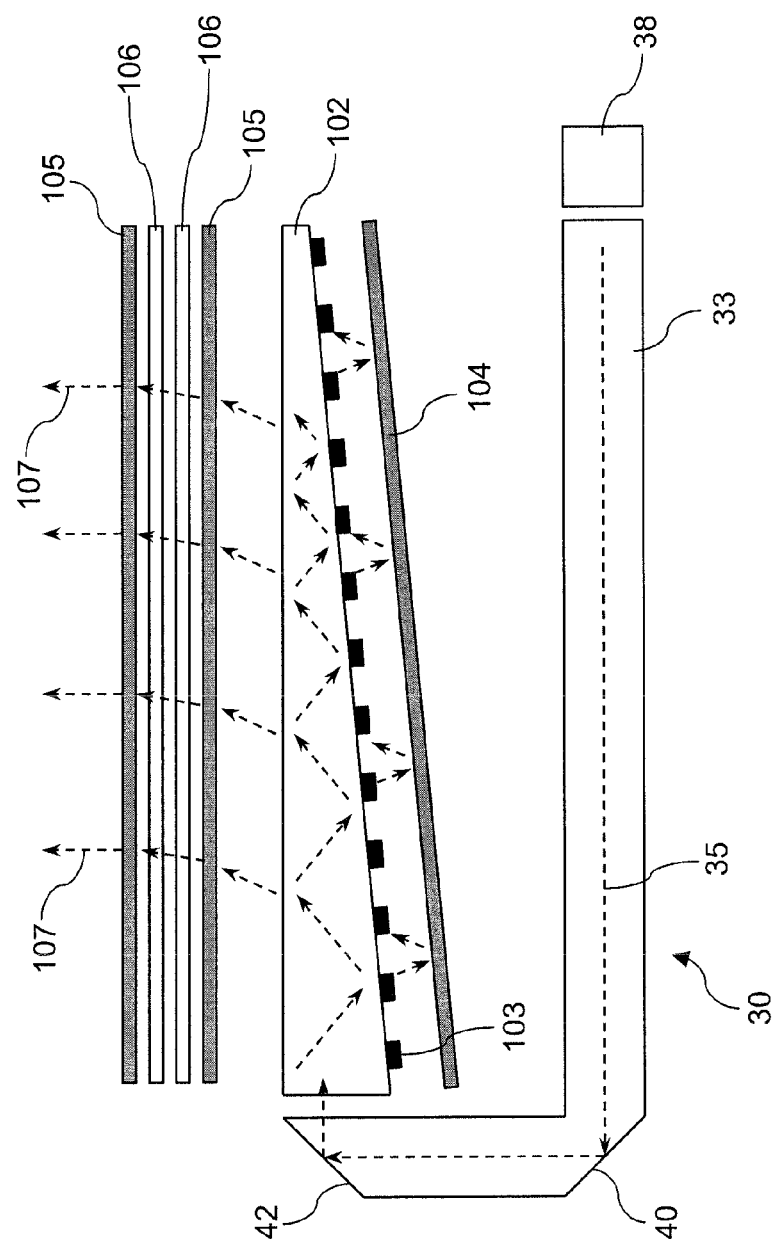
FIG. 31 is a view similar to FIG. 29 however the CCFL has been replaced by a transmissive body according to the present disclosure.

In view of the foregoing, it will be appreciated by the skilled person that the ability of a transmissive body 30 of the present disclosure to receive light from a point light source such as an LED 38 and convert it into a planar strip of light makes it particularly suitable for use with prior art distribution elements and associated optics that require an extended light source. In other words, the present disclosure is adapted to replace the CCFL/lamp reflector/lamp cover assembly in CCFL-illuminated backlighting units, for example as shown in FIGS. 31, 32A and 32B.

Figure 33A:
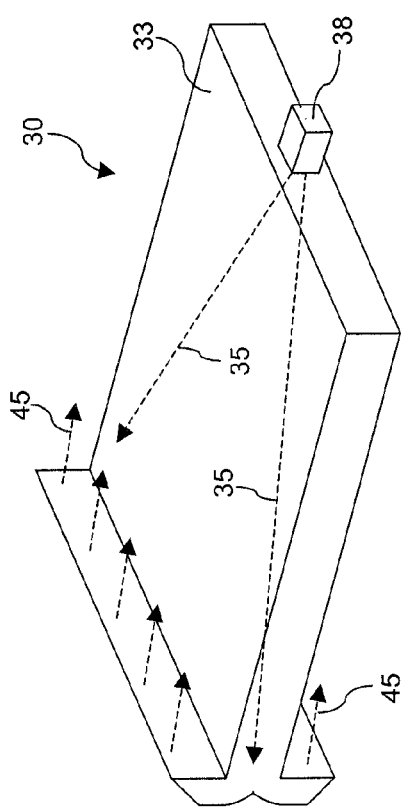
FIGS. 33A and 33B are similar to FIGS. 32A and 32B, but showing multiple illumination capabilities.
Figure 33B:
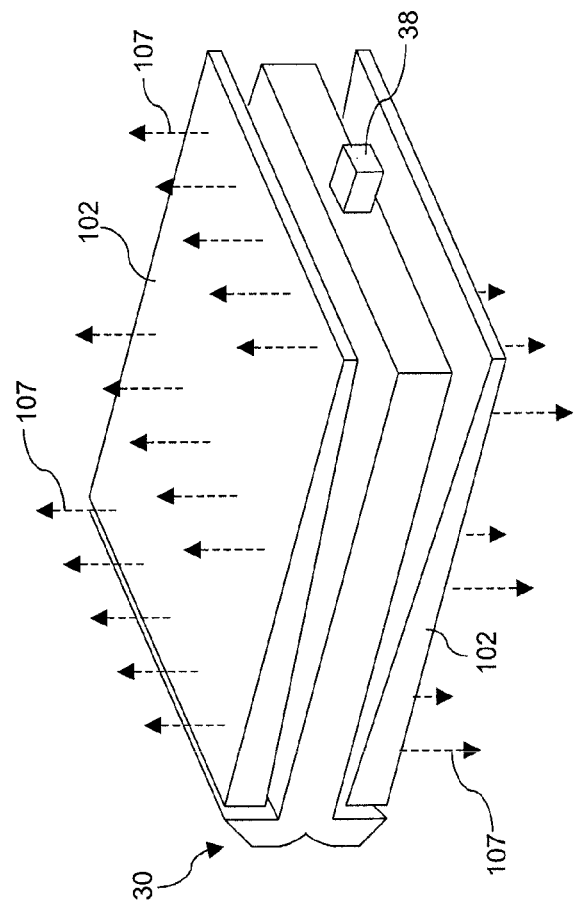
Figure 35:
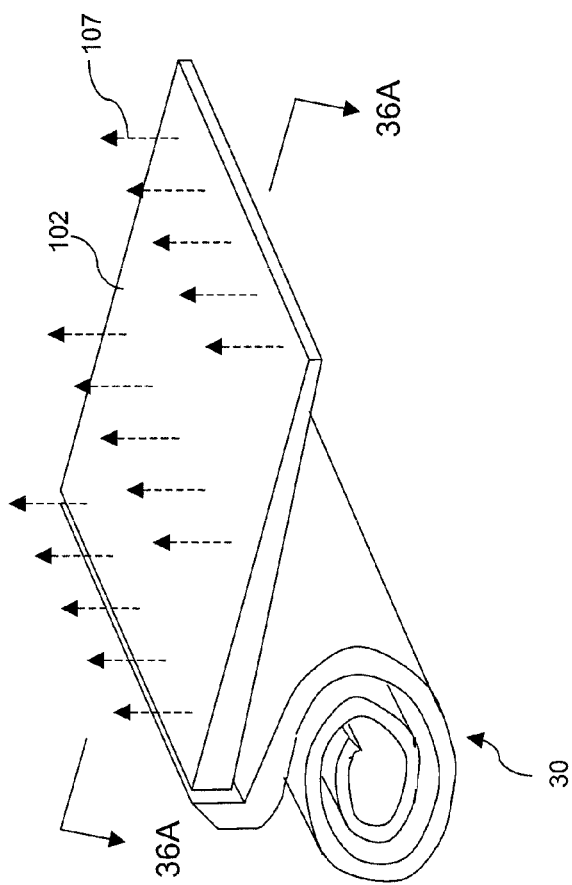
FIG. 35 is a view similar to FIG. 32B but showing a transmissive element of a transmissive body according to the present disclosure rolled up to conserve space.
Figure 36:
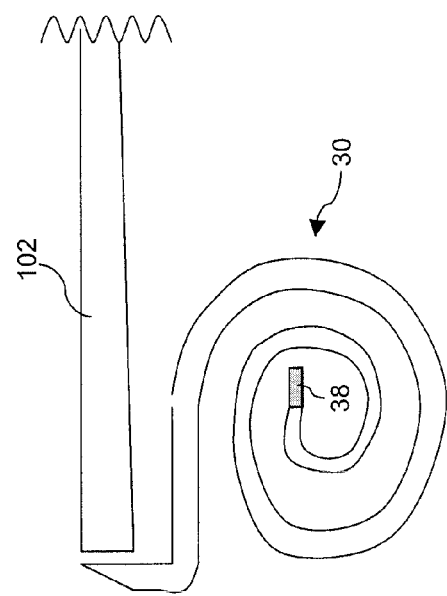
FIG. 36 is a sectional side view of the apparatus shown in FIG. 35.
Figure 37:
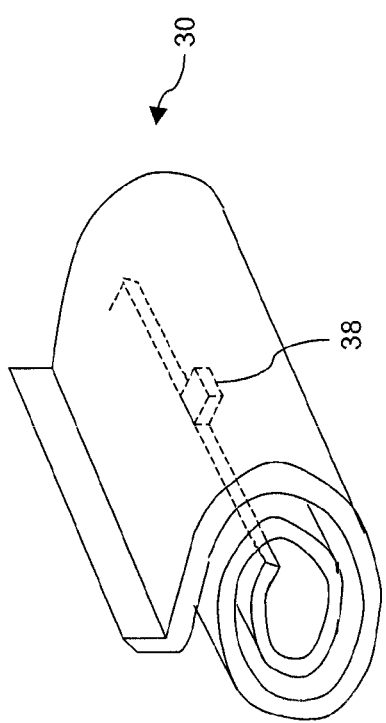
FIG. 37 is a perspective view of the transmissive body shown in FIGS. 35 and 36, in particular illustrating the position of an LED light source (ghosted out)

In related embodiments, such as shown in FIGS. 33A and 33B, a transmissive body 30 of the present disclosure may be used to illuminate two oppositely directed distribution elements 102. Alternatively, opposite edges of a distribution element 102 may be illuminated as illustrated in FIGS. 34A and 34B. In yet further embodiments the transmissive element 33 of a transmissive body 30 or 140 of the present disclosure may be coiled to minimise the footprint of the transmissive body 30, as shown in FIGS. 35 to 37.

It will be appreciated that a single LED 38 could be employed with a transmissive body 30 of the present disclosure, or alternatively, if a higher lux was required, a plurality of LEDs 38 could be grouped together, as shown in FIG. 38. In an alternative embodiment shown in FIG. 39, a spaced array of LEDs may be provided along an edge of a transmissive element 33, with each LED 38 corresponding to collimation/redirection elements 40/42. It will be appreciated from FIG. 28D that in the limit of an array of closely spaced LEDs, a transmissive body 140 with no collimation element could also be used. As discussed previously regarding FIG. 23, these embodiments will also be advantageous if bezel width is a consideration. In further embodiments, a biaxial distribution element 102 for use with a transmissive body 30 as shown in FIG. 40A (or FIG. 8) may be used to illuminate a display. A biaxial distribution element 102 may also be used with the embodiment as shown in FIGS. 41A and 41B.

In related aspects, it will be appreciated that the light output of the distribution element 102 when optically coupled with the transmissive body 30 of the disclosure may be configured to be of a uniform or predetermined intensity profile. Furthermore, the skilled person will appreciate that the LED sources 38 can be white light, or multiple colours like RBG that can be mixed in the distribution element 102. It will further be appreciated that the apparatus of the disclosure may be on one, two, three or four sides of an LCD display.

Whilst the apparatus of the disclosure may be used to replace the fluorescent tube/reflector box in a traditional backlighting unit for an LCD, it will be appreciated that the disclosure is not limited to LCD backlighting. The present disclosure provides several advantages over the prior art, for example the ability to use relatively fewer high power LEDs than direct LED illumination at the back of a LCD, or an array of LEDs at the side of the backlight unit. Understandably, this will save costs and, with proper design, generate more uniform illumination of the display.

The skilled person will appreciate that because the light 45 emanating from a transmissive body 30 is substantially collimated in planar form, it will enter the distribution element 102 of a backlighting system in collimated form. Accordingly, the light emerging from the distribution element 102 may also be substantially collimated (depending on the structure of the patterned elements 103), the effect of which may be to cause a relatively small viewing angle of, say, for a user. In certain circumstances this may be a desirable property for example it may be possible to dispense with one or more of the brightness enhancement cement films 106, thereby reducing cost. However, if for the particular application this is considered undesirable, then the collimated light may be randomised somewhat by the use of diffuser plates 105 or similar. For example apart from the diffuser plate(s) 105 positioned above the distribution element 102, another diffuser plate 105 could be placed between the transmissive body 30 and distribution element 102. In another example, the exit face of the transmissive body could be roughened to diffuse the light.

In yet another aspect of the disclosure there is provided a transmissive body capable of distributing light for both display illumination and touch detection. FIGS. 42 to 45 illustrate various embodiments of a transmissive body capable of distributing light for both display backlighting and touch detection, while FIGS. 46 to 49 illustrate various embodiments of a transmissive body capable of distributing light for both display frontlighting and touch detection.

Figure 42:
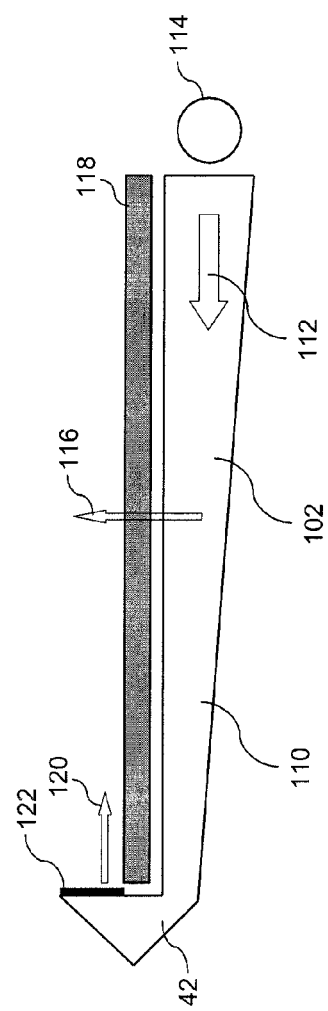
FIGS. 42 to 45 are side views of various apparatus suitable for distributing light for both display backlighting and touch detection.

According to the embodiment shown in FIG. 42, there is provided a transmissive body 110 for combined backlighting and touch detection including a wedge-shaped distribution element 102 and a redirection element 42 that accepts light 112 from an extended light source 114 such as a CCFL or an LED array. A first portion (in most cases the major portion) 116 of the light is directed through a transmissive display 118 by the distribution element 102, as in a conventional backlighting system such as that shown in FIG. 29. The remaining portion 120 of the light is redirected by the element 42 in front of the display 118 for touch input purposes.

Figure 43:
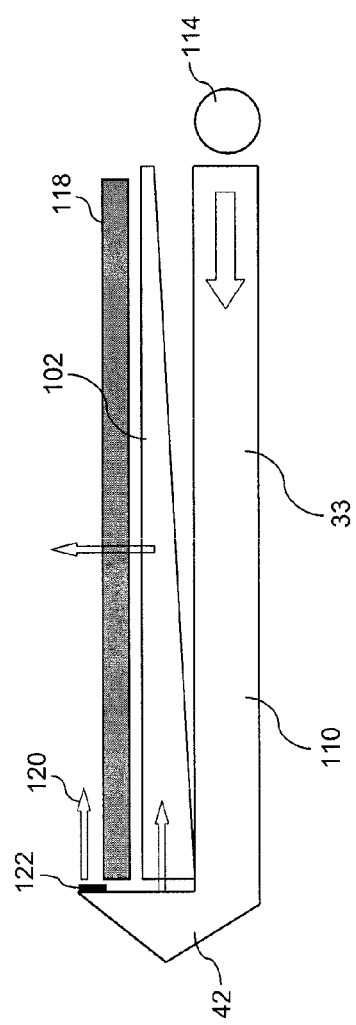

FIG. 43 shows an alternative combined backlighting/touch detection embodiment with a transmissive body 110 including a substantially planar transmissive element 33 and a redirection element 42 that accepts light from an extended light source 114. In this case the redirection element directs a first portion (in most cases the major portion) of the light into a wedge-shaped distribution element 102 that distributes it through a transmissive display 118 as in a conventional backlight, and a second portion 120 of the light in front of the display 118 for touch input purposes.

In the embodiments shown in FIGS. 42 and 43, the transmissive body 110 does not need to have a collimation element because the light source 114 is an extended light source rather than a point source. Further, the same light is used for display illumination and touch detection, so that the touch detection light will be visible light. If this is unacceptable, some variations may be appropriate. For example if the extended light source 114 has a broad emission spectrum extending into the near infrared, an infrared pass filter 122 may be placed on the appropriate part of the redirection on element 42. Alternatively, if the extended light source were an LED array, it would be possible to intersperse one or more near infrared LEDs among the visible LEDs and use an infrared pass filter 122 to remove visible light from the touch detection light. Of course if the transmissive body 110 does have a collimation element, say an elliptical lens surface associated with the infrared pass filter 122, only one (appropriately placed) infrared LED may be necessary amongst the visible LEDs.

Figure 44:
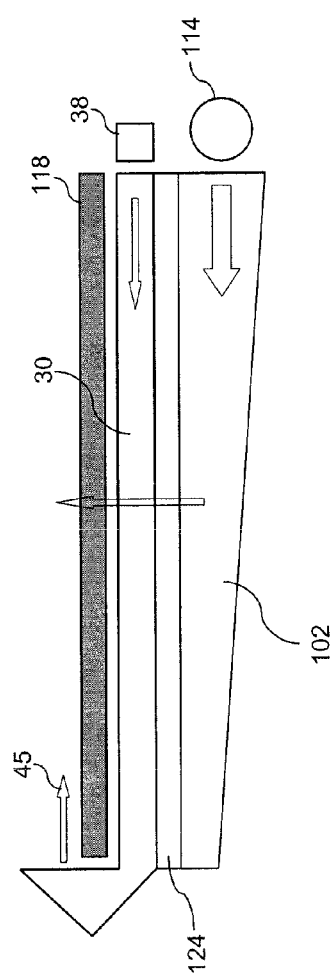

FIG. 44 shows yet another combined backlighting/touch detection embodiment, this time with a composite distribution element 102 and transmissive body 30 preferably separated by a lower refractive index cladding layer 124. In this case the distribution element 102 distributes light from an extended source 114 through a transmissive display 118 as in a conventional backlight, and the transmissive body 30 converts light from a point source 38 into a substantially collimated planar light signal 45 as described above with respect to FIGS. 3 to 5. The lower refractive index cladding layer 124 to prevents mixing of the light from the extended source 114 (typically visible) and the light from the point source 38 (typically infrared). The cladding layer may for example be a layer of a curable polymer coated onto either the transmissive body 30 or the distribution element 102. Alternatively, the cladding layer may simply be an air gap.

Figure 45:
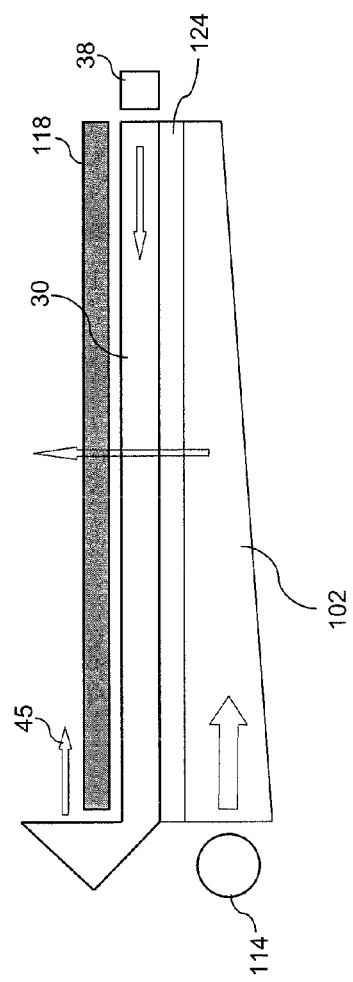
Figure 46:
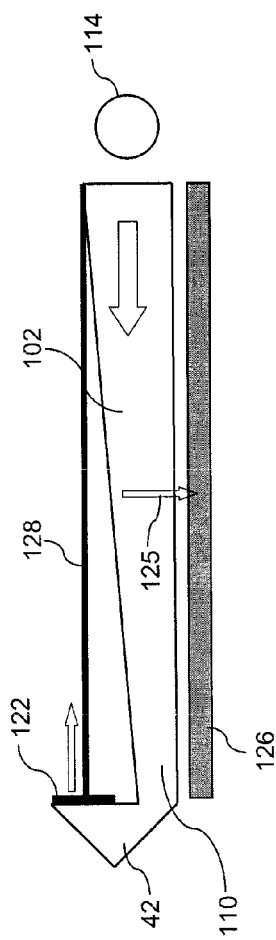
FIGS. 46 to 49 are side views of various apparatus suitable for distributing light for both display front lighting and touch detection.
Figure 47:
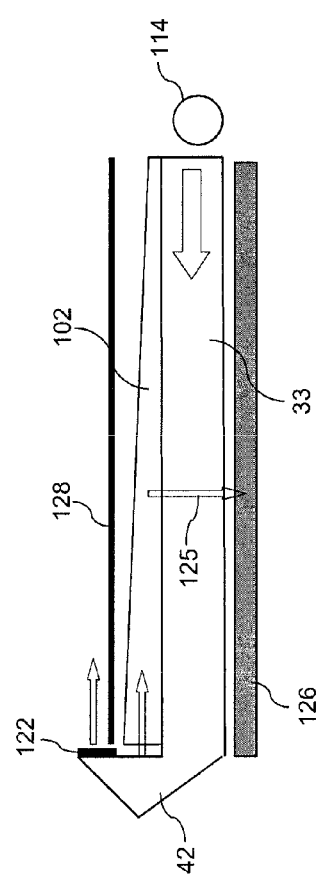
Figure 48:
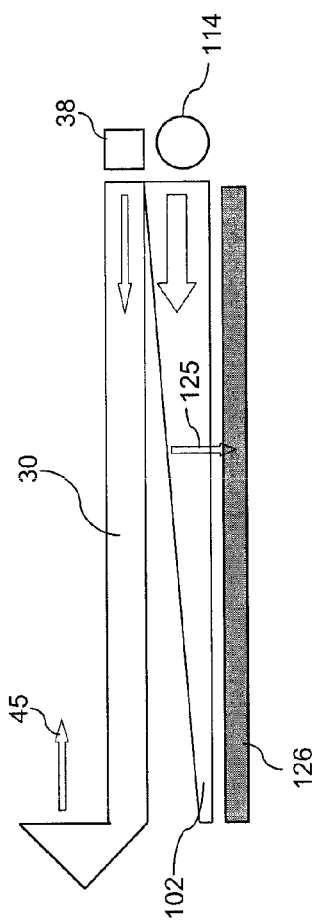
Figure 49:
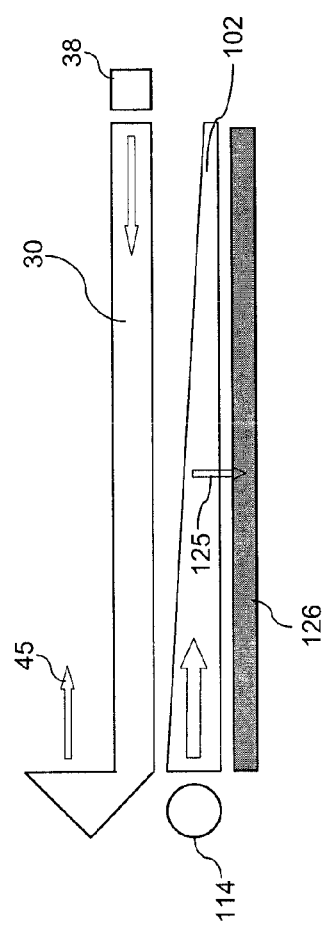

The embodiment shown in FIG. 45 differs from that of FIG. 44 in that the orientation of the distribution plate 102 and the extended light source 114 is reversed. FIGS. 46 to 49 show various embodiments of a combined frontlighting/touch detection apparatus that are in many respects analogous to the combined backlighting/touch detection apparatus shown in FIGS. 42 to 45, except that the light distribution element 102 directs light 125 down to a reflective display 126 rather than up through a transmissive display. Depending on the precise shape of the light distribution element 102, it may be necessary to add a transparent sheet 128 as a flat surface for touch input. A similar transparent sheet may also be present in a combined backlighting/touch detection apparatus, to protect the transmissive display.

Figure 50:
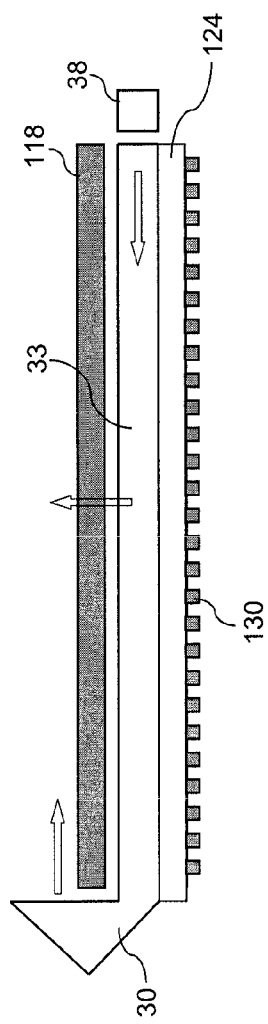
FIG. 50 is a side view of another apparatus suitable for distributing light for both display backlighting and touch detection.

FIG. 50 shows yet another embodiment of a combined backlighting/touch detection apparatus, this time with in the back-lit style (see FIG. 30B) with an array of visible LEDs (e.g. white LEDs or RGB coloured LEDs) 130. Light for touch detection is provided by a transmissive body 30 and a point source 38 as described above with respect to FIGS. 3 to 5. The backlighting LEDs 130 are separated from the transmissive element 33 of the transmissive body 30 by a cladding layer 124 that should have a lower refractive index than the transmissive element, so that light from the point source 38 is confined therein.

For each of the embodiments shown in FIGS. 42 to 50, it will be appreciated 10 that other components of conventional backlighting or frontlighting systems, such as extraction elements, diffuser plates and brightness enhancement films, can be added as required.

A person skilled in the art will understand that in some embodiments if a signal source is provided which produces a collimated signal the collimation element may not be required. In such an embodiment the transmissive body will still receive the optical signal and transmit it as a substantially planar collimated optical signal. For example the point source 38 in FIGS. 44, 45, 48 and 49 could be replaced by another extended light source 114.

Although the disclosure has been described with reference to specific embodiments, it will be appreciated by those skilled in the art that the disclosure may be embodied in many other forms.

The invention claimed is:
1. A transmissive body, comprising:
(a) a transmissive element disposed to receive, confine and transmit optical signals in planar form in a first plane;

(b) a pair of collimation and redirection elements disposed to substantially collimate said optical signal received from said transmissive element and then redirect said collimated optical signal, wherein said transmissive element is disposed to receive said optical signal from an optical source and transmit said optical signal to said collimation and redirection element in a first plane, and said pair of collimation and redirection elements are disposed to produce a corresponding pair of substantially collimated signals in a substantially planar form in a second plane substantially parallel with said first plane, wherein said transmissive element is configured to receive optical signals from more than one optical source, and wherein said pair of substantially collimated planar signals propagate in substantially perpendicular directions.

2. The transmissive body according to claim 1, wherein said redirection elements are disposed to redirect said substantially collimated signals into a planar waveguide integrated with said transmissive element.

3. The transmissive body according to claim 2, wherein said transmissive element is flexible.

4. The transmissive body according to claim 1, wherein said transmissive element is substantially planar.

5. The transmissive body according to claim 4, wherein said substantially collimated planar signals are redirected into a plane substantially coplanar with said transmissive element.

6. The transmissive body according to claim 4, wherein said substantially collimated planar signals are redirected into one or more planes substantially parallel to and spaced from said transmissive element.

7. The transmissive body according to claim 1, wherein said substantially collimated planar signals are correspondingly redirected back towards said more than one optical source.

8. The transmissive body according to claim 1, wherein one or more of said collimation elements and/or said redirection elements are in the form of a mirror or a lens.

9. The transmissive body according to claim 1, wherein said more than one optical source are point sources.

10. The transmissive body according to claim 9, wherein said point sources provide a diverging optical signal.

11. The transmissive body according to claim 10, wherein said collimation elements include one or more substantially parabolic reflectors or one or more substantially elliptical lenses.

12. The transmissive body according to claim 11, wherein each of said one or more substantially parabolic reflectors is shaped and positioned to have a focus which is substantially coincident with said point sources.

13. The transmissive body according to claim 11, wherein each of said one or more substantially elliptical lenses is shaped and positioned such that a focus of said lens is substantially coincident with said point sources.

14. The transmissive body according to claim 1, wherein said collimation elements and said redirection elements are both optically downstream of said transmissive element.

15. The transmissive body according to claim 1, wherein only a portion of said substantially collimated planar signals are redirected.

16. The transmissive body according to claim 1, further comprising a display positioned between said substantially collimated planar signals and said transmissive element.

17. The transmissive body according to claim 1, further comprising a display, wherein said display includes a planar portion as said transmissive element.

18. The transmissive body according to claim 1, wherein said transmissive body is formed from a unitary piece of plastic material substantially transparent to light of the infrared or visible region of the spectrum and optionally opaque to ambient visible light.

19. The transmissive body according to claim 18 wherein said unitary piece of plastic material is formed by injection molding.

20. The transmissive body according to claim 18, wherein said unitary piece of plastic material is formed by injection molding.

21. A transmissive body, comprising:
(a) a transmissive element disposed to receive, confine and transmit in a first plane an optical signal in planar form;
(b) a pair of collimation elements disposed to substantially collimate said optical signal received from said transmissive element; and
(c) a pair of redirection elements disposed to redirect said collimated optical signals to produce a corresponding pair of substantially collimated signals in a substantially planar form in a second plane substantially parallel with said first plane,
wherein said transmissive element is configured to receive said optical signal from a single optical source, and
wherein said pair of substantially collimated planar signals propagate in substantially perpendicular directions.

22. The transmissive body according to claim 21, wherein said transmissive body is formed of one of: a.) a unitary body comprising all three of said collimation, redirection and transmissive elements, b.) a pair of bodies wherein one of said bodies comprises any two of said collimation, redirection and transmissive elements and the other of said bodies comprises the remaining element, and c.) a triad of bodies, each said body comprising one of said collimation, redirection and transmissive elements.

23. The transmissive body according to claim 21, wherein said pair of substantially collimated planar signals propagate in mutually spaced apart substantially parallel planes.

24. The transmissive body according to claim 21, wherein said pair of substantially collimated planar signals are coplanar.

25. The transmissive body according to claim 21, wherein said redirection elements are disposed to redirect said substantially collimated signals into a planar waveguide integrated with said transmissive element.

26. The transmissive body according to claim 25, wherein said transmissive element is flexible.

27. The transmissive body according to claim 21, wherein said transmissive element is substantially planar.

28. The transmissive body according to claim 27, wherein said substantially collimated planar signals are redirected into a plane substantially coplanar with said transmissive element.

29. The transmissive body according to claim 27, wherein said substantially collimated planar signals are redirected into one or more planes substantially parallel to and spaced from said transmissive element.

30. The transmissive body according to claim 21, wherein said substantially collimated planar signals are correspondingly redirected back towards said optical source.

31. The transmissive body according to claim 21, wherein one or more of said collimation elements and/or said redirection elements are in the form of a mirror or a lens.

32. The transmissive body according to claim 21, wherein said optical source is a point source.

33. The transmissive body according to claim 32, wherein said point source provides a diverging optical signal.

34. The transmissive body according to claim 33, wherein said collimation elements include one or more substantially parabolic reflectors or one or more substantially elliptical lenses.

35. The transmissive body according to claim 34, wherein each of said one or more substantially parabolic reflectors is shaped and positioned to have a focus which is substantially coincident with said point source.

36. The transmissive body according to claim 34, wherein each of said one or more substantially elliptical lenses is shaped and positioned such that a focus of said lens is substantially coincident with said point source.

37. The transmissive body according to claim 21, wherein said collimation elements and said redirection elements are both optically downstream of said transmissive element.

38. The transmissive body according to claim 21, wherein only a portion of said substantially collimated planar signals are redirected.

39. The transmissive body according to claim 21, further comprising a display positioned between said substantially collimated planar signals and said transmissive element.

40. The transmissive body according to claim 21, further comprising a display positioned on a side of said transmissive element opposite to said substantially collimated planar signals.

41. The transmissive body according to claim 21, further comprising a display, wherein said display includes a planar portion as said transmissive element.

42. The transmissive body according to claim 21, wherein said transmissive body is formed from a unitary piece of plastic material substantially transparent to light of the infrared or visible region of the spectrum and optionally opaque to ambient visible light.

43. The transmissive body according to claim 42, wherein said unitary piece of plastic material is formed by injection molding.

44. A input and display device comprising:
(a) a transmissive element disposed to receive, confine and transmit an optical signal in planar form in a first plane;
(b) a collimation and redirection element disposed to substantially collimate said optical signal received from said transmissive element and then redirect said collimated optical signal; and
(c) a display positioned on a side of said transmissive element opposite to said substantially collimated planar signals,
wherein said transmissive element is disposed to receive said optical signal from an optical source and transmit said optical signal to said collimation and redirection element in a first plane, and said collimation and redirection element is disposed to produce a substantially collimated signal in a substantially planar form in a second plane substantially parallel with said first plane.

45. A transmissive body comprising:
(a) a transmissive element disposed to receive, confine and transmit an optical signal in planar form in a first plane;
(b) a collimation and redirection element disposed to substantially collimate said optical signal received from said transmissive element and then redirect said collimated optical signal; and
(c) at least one light detecting element configured to receive at least a portion of said substantially collimated planar signal for detecting an input,
wherein said transmissive element is disposed to receive said optical signal from an optical source and transmit said optical signal to said collimation and redirection element in a first plane, and said collimation and redirection element is disposed to produce a substantially collimated signal in a substantially planar form in a second plane substantially parallel with said first plane,
wherein said collimation and redirection element is a unitary piece of plastic material substantially transparent to light of the infrared or visible region of the spectrum and optionally opaque to ambient visible light.

46. The transmissive body according to claim 45, wherein said unitary piece of plastic material is formed by injection molding.

47. The transmissive body according to claim 45, wherein said transmissive element is glass.

48. The transmissive body according to claim 45, wherein said at least one light detecting element includes at least one optical waveguide in optical communication with at least one photo-detector.

49. An assembly for an input device and for illuminating a display, said assembly comprising:
(a) a transmissive element disposed to receive, confine and transmit an optical signal in planar form in a first plane;
(b) a collimation and redirection element disposed to substantially collimate said optical signal received from said transmissive element and then redirect said collimated optical signal; and
(c) a distribution element adjacent said transmissive element for receiving and distributing light from a light source to said display thereby illuminating said display; and
(d) a cladding layer disposed between said transmissive element and said distribution element for reducing leakage of said light from said distribution element into said transmissive element, and for reducing leakage of said optical signal from said transmissive element into said distribution element,
wherein said transmissive element is disposed to receive said optical signal from an optical source and transmit said optical signal to said collimation and redirection element in a first plane, and said collimation and redirection element is disposed to produce a substantially collimated signal in a substantially planar form in a second plane substantially parallel with said first plane.

50. The assembly according to claim 49, wherein said distribution element is positioned such that said light source for supplying said light to said distribution element and said optical source for supplying said optical signal to said transmissive element are positioned on the same side of said transmissive element.

51. The assembly according to claim 49, wherein said distribution element is positioned such that said light source for supplying said light to said distribution element and said optical source for supplying said optical signal to said transmissive element are positioned on mutually opposed sides of said transmissive element.

52. The assembly according to claim 49, wherein said optical signal includes one or more predetermined wavelengths from the infrared region of the spectrum and said light includes one or more predetermined wavelengths from the visible region of the spectrum.

53. The assembly according to claim 49, wherein said optical signal and said light each include one or more predetermined wavelengths from the visible region of the spectrum.

54. The assembly according to claim 49, wherein said display is positioned above said transmissive element.

55. The assembly according to claim 49, wherein said light source for supplying said light is a cold cathode fluorescent lamp or an array of LEDs, and said optical source for supplying said optical signal is an LED or a group of LEDs.

56. An assembly for an input device and for illuminating a display, said assembly comprising:
(a) a transmissive element disposed to receive, confine and transmit an optical signal in planar form in a first plane;
(b) a collimation and redirection element disposed to substantially collimate said optical signal received from said transmissive element and then redirect said collimated optical signal; and
(c) a distribution element adjacent said transmissive element for receiving and distributing light from a light source to said display thereby illuminating said display; and
wherein said display is positioned beneath said transmissive element, and
wherein said transmissive element is disposed to receive said optical signal from an optical source and transmit said optical signal to said collimation and redirection element in a first plane, and said collimation and redirection element is disposed to produce a substantially collimated signal in a substantially planar form in a second plane substantially parallel with said first plane.

57. An assembly for an input device and for illuminating a display, comprising:
(a) a transmissive element disposed to receive, confine and transmit an optical signal in planar form in a first plane;
(b) a collimation and redirection element disposed to substantially collimate said optical signal received from said transmissive element and then redirect said collimated optical signal;
(c) one or more light sources for producing light, said light sources positioned beneath said transmissive element to thereby illuminate said display through said transmissive element; and
(d) a cladding layer disposed between said one or more light sources and said transmissive element for reducing leakage of light from said transmissive element into said one or more light sources, or for reducing interaction between said optical signal in said transmissive element and said one or more light sources,
wherein said transmissive element is disposed to receive said optical signal from an optical source and transmit said optical signal to said collimation and redirection element in a first plane, and said collimation and redirection element is disposed to produce a substantially collimated signal in a substantially planar form in a second plane substantially parallel with said first plane.

58. The assembly according to claim 57, wherein said one or more light sources are LEDs.

59. The assembly according to claim 58 wherein said LEDs produce one or more predetermined wavelengths from the visible region of the spectrum.

60. The assembly according to claim 57, wherein said display is positioned above said transmissive element.

61. A method for producing an optical signal in substantially collimated planar form, said method comprising the steps of:
providing optical signals from a pair of optical sources;
providing pairs of collimation elements and redirection elements;
receiving, confining and transmitting said optical signal in planar form in a first plane;
substantially collimating said optical signal received in said first plane with the collimation elements; and
redirecting said collimated optical signal in a second plane substantially parallel with said first plane with the redirection elements,
wherein said pairs of collimation elements and redirection elements provide a pair of substantially collimated planar signals propagating in substantially perpendicular directions.

62. The method according to claim 61, further comprising the step of: redirecting said substantially collimated planar signals back towards said optical sources.

63. A method for producing an optical signal in substantially collimated planar form, said method comprising the steps of:
providing an optical signal from a single optical source;
providing pairs of collimation elements and redirection elements;
receiving, confining and transmitting said optical signal in planar form in a first plane;
substantially collimating said optical signal received in said first plane with the collimation elements; and
redirecting said collimated optical signal in a second plane substantially parallel with said first plane with the redirection elements with the redirection elements,
wherein said pairs of collimation elements and redirection elements provide a pair of substantially collimated planar signals propagating in substantially perpendicular directions.

64. The method according to claim 63, wherein said optical source is a point source providing a diverging optical signal and said collimation element includes one or more substantially parabolic reflectors or one or more substantially elliptical lenses.

65. The method according to claim 64, wherein each of said one or more substantially parabolic reflectors is shaped and positioned such that its focus is substantially coincident with said point source.

66. The method according to claim 64, wherein each of said one or more substantially elliptical lenses is shaped and positioned such that a focus of said lens is substantially coincident with said point source.

67. The assembly according to claim 63, wherein said optical source is an LED.

68. A transmissive body for an input device and for illuminating a display, said body comprising:
a transmission and distribution element disposed to receive, confine and transmit a first portion of a light signal in a substantially planar form in a first plane;
a touch surface transparent to said light signal positioned above said transmission and distribution element;
a redirection element disposed to receive said light signal in said first plane and to redirect said substantially planar light signal in a second plane substantially parallel with said first plane into an input device,
wherein said transmission and distribution element simultaneously distributes a second portion of said light signal to said display thereby illuminating said display,
wherein said display is positioned beneath said transmission and distribution element.

69. The transmissive body according to claim 68, wherein said redirection element is disposed to redirect said substantially planar light signal into a planar waveguide integrated with said transmissive element.

70. The transmissive body according to claim 69, wherein said transmissive and distribution element is flexible.

71. The transmissive body according to claim 68, wherein said transmissive and distribution element is substantially planar.

72. The transmissive body according to claim 71, wherein said redirection element redirects said substantially planar light signal into one or more planes substantially parallel to and spaced from said transmissive element.

73. The transmissive body according to claim 68, wherein said substantially planar light signal is redirected back towards an optical source providing said light signal.

74. The transmissive body according to claim 73, wherein said optical source is a point source.

75. The transmissive body according to claim 74, wherein said point source provides a diverging optical signal.

76. The transmissive body according to claim 68, wherein said redirection element is in the form of a mirror or a lens.

77. The transmissive body according to claim 68, wherein only a portion of said substantially planar light signal is redirected.

78. The transmissive body according to claim 68, wherein said transmissive and distribution element is formed from a unitary piece of plastic material substantially transparent to light of the infrared region of the spectrum.

* * * * *